US009756373B2

(12) United States Patent
Houston et al.

(10) Patent No.: US 9,756,373 B2
(45) Date of Patent: Sep. 5, 2017

(54) CONTENT STREAMING AND BROADCASTING

(71) Applicant: Booma, Inc., Pacific Palisades, CA (US)

(72) Inventors: David Howard Houston, Pacific Palisades, CA (US); Charles Mark DeLauder, Los Angeles, CA (US); Andrew Norman Wombwell, Los Angeles, CA (US); Daniel Aaron Delshad, Los Angeles, CA (US)

(73) Assignee: Booma, Inc., Pacific Palisades, CA (US)

( * ) Notice: Subject to any disclaimer, the term of this patent is extended or adjusted under 35 U.S.C. 154(b) by 0 days.

(21) Appl. No.: 14/839,858

(22) Filed: Aug. 28, 2015

(65) Prior Publication Data
US 2017/0064359 A1    Mar. 2, 2017

(51) Int. Cl.
*H04N 7/173* (2011.01)
*H04N 21/2665* (2011.01)
*H04N 21/2187* (2011.01)
*H04N 21/231* (2011.01)
*H04N 21/2343* (2011.01)
*H04N 21/239* (2011.01)
*H04N 21/234* (2011.01)
*H04N 21/2743* (2011.01)

(52) U.S. Cl.
CPC ..... *H04N 21/2665* (2013.01); *H04N 21/2187* (2013.01); *H04N 21/2343* (2013.01); *H04N 21/2393* (2013.01); *H04N 21/23106* (2013.01); *H04N 21/23424* (2013.01); *H04N 21/2743* (2013.01)

(58) Field of Classification Search
USPC .................................................. 725/109–110
See application file for complete search history.

(56) References Cited

U.S. PATENT DOCUMENTS

| 8,224,352 | B2 | 7/2012 | Ko |
| 8,428,453 | B1 | 4/2013 | Spiegel et al. |
| 8,621,019 | B2 | 12/2013 | Nguyen et al. |
| 8,737,803 | B2 | 5/2014 | Pereira |
| 8,775,972 | B2 | 7/2014 | Spiegel |
| 8,838,696 | B2 | 9/2014 | Tiwari |
| 8,909,725 | B1 | 12/2014 | Sehn |

(Continued)

OTHER PUBLICATIONS

US Office Action dated Oct. 13, 2016, from related U.S. Appl. No. 14/839,864.

(Continued)

*Primary Examiner* — Mulugeta Mengesha
(74) *Attorney, Agent, or Firm* — Foley & Lardner LLP

(57) ABSTRACT

Apparatuses and methods are described herein for interactive streaming among a broadcasting device and a plurality of viewing devices, including, but not limited to, receiving, by a server, a request from the broadcasting device to output content captured by the plurality of viewing devices as an output stream. The server queues the plurality of viewing devices for displaying the content in the output stream sequentially. The server receives the content from each of the plurality of viewing devices. The server stitches the content from each of the plurality of viewing devices into the same output stream for displaying the content in real time.

21 Claims, 16 Drawing Sheets

(56) References Cited

U.S. PATENT DOCUMENTS

| | | |
|---|---|---|
| 8,914,752 B1 | 12/2014 | Spiegel |
| 9,015,285 B1 | 4/2015 | Ebsen et al. |
| 9,026,943 B1 | 5/2015 | Spiegel |
| 9,083,770 B1 | 7/2015 | Drose et al. |
| 9,094,137 B1 | 7/2015 | Sehn |
| 9,306,998 B2 | 4/2016 | Nguyen et al. |
| 2004/0205830 A1 | 10/2004 | Kaneko |
| 2006/0274201 A1 | 12/2006 | Lim |
| 2008/0086750 A1 | 4/2008 | Yasrebi et al. |
| 2010/0077441 A1 | 3/2010 | Thomas et al. |
| 2012/0246266 A1* | 9/2012 | Mallet .................... G06Q 50/01 709/217 |
| 2012/0246677 A1* | 9/2012 | Fasting .................... H04N 7/14 725/34 |
| 2013/0013698 A1 | 1/2013 | Relyea et al. |
| 2013/0027289 A1 | 1/2013 | Choi et al. |
| 2014/0036090 A1 | 2/2014 | Black et al. |
| 2014/0129953 A1 | 5/2014 | Spiegel |
| 2014/0150042 A1 | 5/2014 | Pacor et al. |
| 2014/0359024 A1 | 12/2014 | Spiegel |
| 2014/0359032 A1 | 12/2014 | Spiegel et al. |
| 2015/0074700 A1 | 3/2015 | Danovitz |
| 2015/0084838 A1* | 3/2015 | Chang .................... G06F 3/1454 345/2.1 |
| 2015/0172605 A1* | 6/2015 | Anwar ............. H04N 21/47202 348/159 |

OTHER PUBLICATIONS

US Office Action dated Jul. 5, 2016, from related U.S. Appl. No. 14/839,803.

"Lee, Nicole "Twitter's Periscope is the best livestreaming video app yet" Engadget, Mar. 26, 2015, Retrieved from the internet at: http://www.engadget.com/2015/03/26/periscope/ on Jul. 20, 2015. 10 pages as printed."

US Office Action dated Feb. 9, 2017, from related U.S. Appl. No. 14/839,803.

U.S. Notice of Allowance dated Mar. 30, 2017, from U.S. Appl. No. 14/839,864.

U.S. Office Action dated Jun. 5, 2017, from U.S. Appl. No. 14/839,803.

* cited by examiner

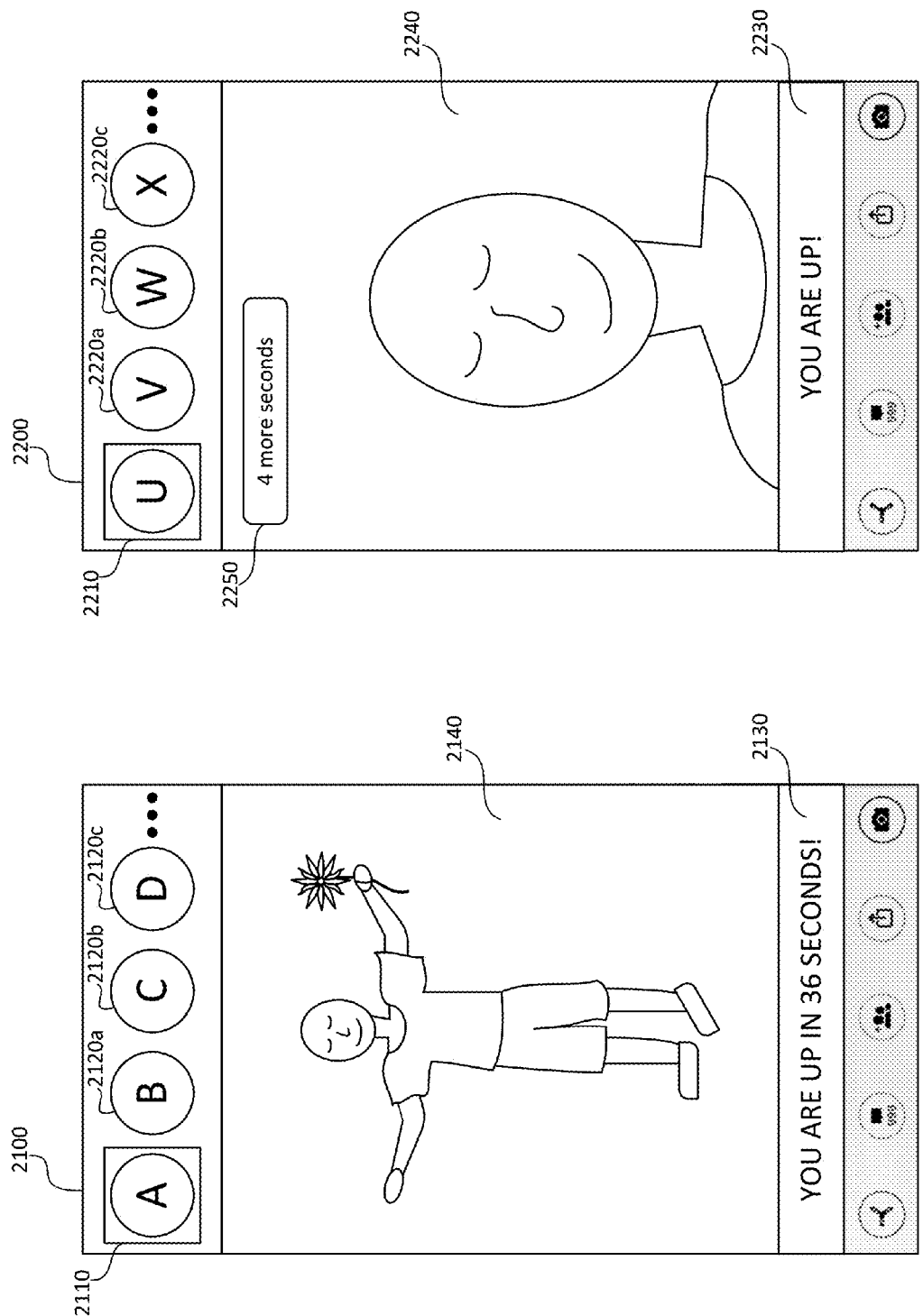

CONTENT STREAMING AND BROADCASTING

CROSS-REFERENCE TO RELATED APPLICATIONS

This application is related to U.S. patent application Ser. No. 14/839,864 entitled "Content Streaming and Broadcasting," filed Aug. 28, 2015, which is fully incorporated herein by reference in its entirety. This application is also related to U.S. patent application Ser. No. 14/839,803 entitled "Content Streaming and Broadcasting," filed Aug. 28, 2015, which is fully incorporated herein by reference in its entirety.

BACKGROUND

1. Field

The present embodiments relate generally to the field of content broadcasting and streaming, and particularly, to broadcaster-viewer interactions in content broadcasting and streaming.

2. Background

Advances in mobile technology enable audiovisual contents to be streamed to mobile devices with improved reliability, speed, and accessibility. As network speed and processing power increase with time, streaming services broadcasting user-generated contents are becoming progressively popular.

A broadcaster that does not have viewers will likely never broadcast again. Therefore, it is critical to attract as many viewers for the broadcaster as possible, to make broadcasting rewarding. Viewer engagement may also be an important aspect of broadcasting platforms, given that viewer interest level may be directly related to a number of viewers using the broadcasting platforms.

Conventional broadcasting platforms may not allow the broadcaster to go live at the appropriate moment when the broadcasting platforms cannot connect to a network or when the network speed is below an acceptance level. A broadcaster who is unable to capture a moment intended to be live may not find the broadcasting platform to be reliable.

SUMMARY OF THE INVENTION

Embodiments described herein relate to broadcasting and streaming services for obtaining and distributing user generated content. A platform for broadcasting and streaming may be formed as an application or software on a mobile device for broadcasters and viewers. A server may be provided to control interactions between the broadcasting device and the viewing devices. The platform may include a network of contacts for distribution of media content from the broadcasters to the viewers, vice versa. In addition or alternatively, the platform may include links interfacing with existing social networks to connect the broadcasters and viewers. Streaming notifications, invitations, or the like may be distributed via such networks.

A method for interactive streaming among a broadcasting device and a plurality of viewing devices is described herein according to some embodiments, the method includes, receiving, by a server, a request from the broadcasting device to output content captured by the plurality of viewing devices as an output stream. The server queues the plurality of viewing devices for displaying the content in the output stream sequentially. The server receives the content from each of the plurality of viewing devices. The server stitches the content from each of the plurality of viewing devices into the same output stream for displaying the content in real time.

In some embodiments, the method further includes sending, by the server, the stitched output stream to the plurality of viewing devices and the broadcasting device to be displayed.

In some embodiments, the method further includes sending, by the server, content of the broadcasting device to the plurality of viewing devices prior to sending the stitched output stream to the plurality of viewing devices.

In various embodiments, the plurality of viewing devices are outputting the content of the broadcasting device concurrent with the server receiving the request.

In some embodiments, the plurality of viewing devices are queued based on a time at which each of the plurality of viewing devices started to receive the content of the broadcasting device.

According to some embodiments, the plurality of viewing devices are queued at random.

In some embodiments, the method further includes providing, by the server to each of the plurality of viewing devices, an indication of a position in the queue for each of the plurality of viewing devices.

According to various embodiments, the request to output content captured by the plurality of viewing devices is based on user input of a broadcaster using the broadcasting device.

In some embodiments, a predetermined length of the content from each of the plurality of viewing devices is stitched in the output stream. The predetermined length of the content for each of the plurality of viewing devices is the same in the output stream.

In various embodiments, the predetermined length is determined by the server as default, or the predetermined length corresponds to a broadcaster-set length of time received from the broadcasting device.

In various embodiments described is a non-transitory computer-readable medium storing computer-readable instructions, such that, when executed by a processor, performs a method for interactive streaming among a broadcasting device and a plurality of viewing devices, the method including: receiving a request from the broadcasting device to output content captured by the plurality of viewing devices as an output stream, queuing the plurality of viewing devices for displaying the content in the output stream sequentially, receiving the content from each of the plurality of viewing devices, and stitching the content from each of the plurality of viewing devices into the same output stream for displaying the content in real time.

According to various embodiments, the method further includes sending, by the server, the stitched output stream to the plurality of viewing devices and the broadcasting device to be displayed.

In some embodiments, the method further includes sending, by the server, content of the broadcasting device to the plurality of viewing devices prior to sending the stitched output stream to the plurality of viewing devices.

In some embodiments, the plurality of viewing devices are outputting the content of the broadcasting device concurrent with the server receiving the request.

In some embodiments, the plurality of viewing devices are queued based on a time at which each of the plurality of viewing devices started to receive the content of the broadcasting device.

According to some embodiments, the plurality of viewing devices are queued at random.

In various embodiments, the method further includes providing, by the server to each of the plurality of viewing devices, an indication of a position in the queue for each of the plurality of viewing devices.

In some embodiments, the request to output content captured by the plurality of viewing devices is based on user input of a broadcaster using the broadcasting device.

According to some embodiments, a predetermined length of the content from each of the plurality of viewing devices is stitched in the output stream.

In some embodiments, a method for interactive streaming among a broadcasting device and a plurality of viewing devices is described herein, including, but not limited to, receiving, by a first viewing device of the plurality of viewing devices from a server, a position in queue to output content from the first viewing device. The first viewing device receives stitched real-time content from the server, the content being from at least one of the plurality of viewing devices other than the first viewing device as output stream. The first viewing device displays the received stitched real-time content. The first viewing device sends, to the server, the content of the first viewing device based on the position of the first viewing device in queue.

BRIEF DESCRIPTION OF THE DRAWINGS

The disclosure will become more fully understood from the following detailed description, taken in conjunction with the accompanying figures, wherein like reference numerals refer to like elements, in which:

FIG. 21 is an example of a display screen displaying an interactive broadcasting interface according to various embodiments.

FIG. 22 is an example of a display screen displaying an interactive broadcasting interface according to various embodiments.

DETAILED DESCRIPTION

Figure 1:
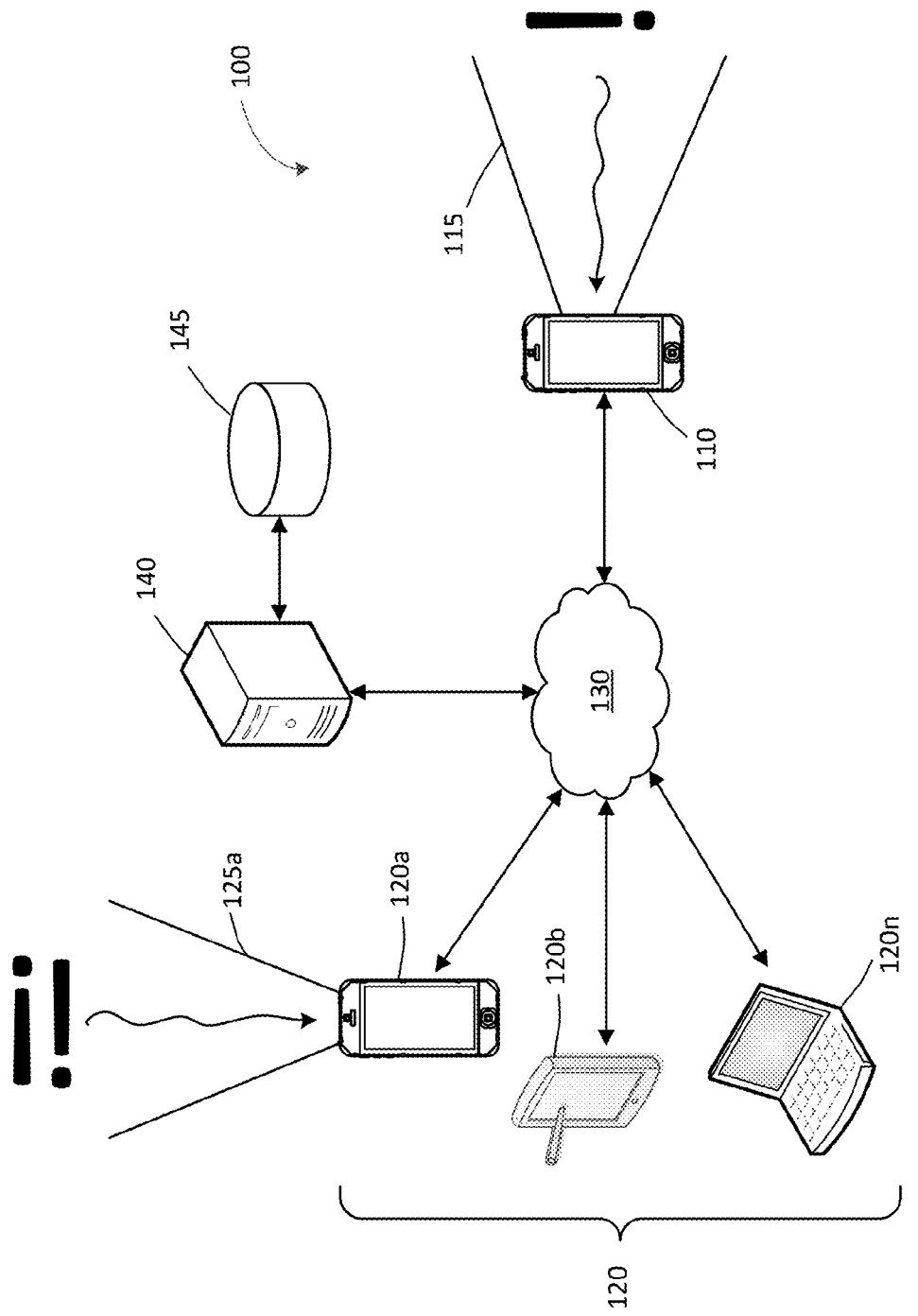
FIG. 1 is a schematic block diagram illustrating an example of a broadcasting system according to various embodiments.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure may be practiced without these specific details. In some instances, structures and devices are shown in block diagram form in order to avoid obscuring the concepts of the present disclosure. Acronyms and other descriptive terminology may be used merely for convenience and clarity and are not intended to limit the scope of the present disclosure.

Embodiments described herein relate to software platform for media content broadcasting and streaming on mobile devices (e.g., smart phones, tablets, or the like). A broadcasting device (used by a broadcaster) may initiate a streaming session to stream media content via a network to be viewed by viewing devices (each used by a user). The content may include live audiovisual content captured by a camera and a microphone on the broadcasting device. The content may also include text or audio comments, with the audiovisual content. The viewers may be social media friends/followers or invitees of the broadcaster, who may like to view a live video stream from the broadcaster. For example, the software platform may include links to existing online social network to access a social contact list of the broadcaster. The software platform may also include its own social network for the same purpose.

After the broadcasting device initiates the streaming session, the broadcasting device can notify the viewers (on the viewing devices) to spectate the stream by accessing the social contact list and sending notifications to the viewing devices. At least one of the viewers (on a viewing device) may be invited to "take over" the output stream, such that at least a portion (or all) of the output stream includes media content captured by a camera and/or a microphone on that invited viewer's viewing device. To achieve this, the broadcasting device may send a live video to a server, for broadcasting an output video stream to viewers. The broadcaster may also send an invitation to share to one of the viewers (on a viewing device). The viewer (on the viewing device), upon accepting the invitation, may send its own media content captured by the camera and/or the microphone on the viewing device, to the server, to be broadcasted in the output stream. In other words, the invited viewer can take over some or all of the video stream that is outputted to the other viewers. The broadcasting device may enable or terminate the takeover based on user inputs of the broadcaster. Upon termination of the takeover, the output stream may again include only the media content originating from the broadcasting device.

In additional embodiments, the (first) invited viewer may, in turn, pass on the takeover to a second viewer (using another viewing device). The second viewer may take over the output stream in a similar manner from the first viewer and/or the broadcaster at least partially. For example, the output media stream may include media content captured by both the broadcaster's device and the second viewing device. The broadcasting device may have an option (configured as a user interactive element, soft switch, actuator, operator, or the like) to permit or deny the first viewer's invitation to the second viewer before the takeover is passed to the second viewer. In further embodiments, after the takeover has been passed to the second viewer, the broadcaster may have an option (configured as a user interactive element, soft switch, actuator, or the like) to terminate the takeover to return the output stream back to the broadcaster. The first viewer may also have an option (configured as a user interactive element, soft switch, actuator, or the like) to terminate the takeover to return the output stream back to the broadcaster.

In some embodiments, once an invited viewer (e.g., the first viewer, the second viewer, or the like) "takes over" the video stream, only the media content from the invited viewing device (instead of the broadcasting device) is outputted from the server to the rest of the viewing devices as the output stream. In other embodiments, the media content from the broadcasting device and the invited viewing device is combined to be outputted by the server as the output stream, to be displayed simultaneously on a same screen, in a split screen, or in an overlapping format. The broadcaster (via the broadcasting device) may control the position of the split in the split-screen or the size and position of a window displaying the invited viewer's media content. At the same time, the viewers (on the viewing devices) can observe the change in the size and position of the window. In this manner, the broadcaster can control and dynamically change the relative sizes of the two portions of the screen that display the media content from the broadcaster and the invited viewer (e.g., to provide the broadcaster's media content on a larger, smaller, or equal sized portion of the display screen, when displayed on the viewing devices).

A viewer (on a viewing device) may receive the output stream (which may include media content from the broadcasting device, the invited viewing device, or both) as described herein, and may selectively retrieve and replay a just-played segment of the media content. For example, if a viewer (on a viewing device) sees an interesting or funny event in the video stream being displayed on that viewer's device, the viewer may activate a soft button (or a user interactive element, soft switch, actuator, operator, or the like) to cause the viewing device to record and replay the last predetermined number of seconds of the video stream. The viewer may relay the segment to other network users, via email, posting on social media, etc.

In the examples herein, the broadcaster (on the broadcasting device) may select and control which viewer (on a viewing device) may add content to or take over the video stream. In other examples, the server may select a viewer (on a viewing device) to add content to or take over the output video stream for a predefined period of time (e.g., 5 sec.), may select another viewer (on another viewing device), and so forth, such that the output video stream includes a series of short video segments captured by a plurality of different viewing devices, to be played on each of the viewing devices in a sequential manner in the single, uninterrupted video stream. Participating viewers (on viewing devices) may be queued by the server, and the server may provide a queue position or starting time to each participating viewer on the corresponding viewing device. At or shortly before the starting time for a viewer, the camera on that viewing device may begin capturing live audiovisual media content and may continue for the duration of the predefined time period, while the server may provide that live content as the output stream to all viewing devices. Then, the participating viewer next in the queue is selected and media content captured by the corresponding viewing device may be provided as the output stream, and so forth. In this manner, the output stream may include real-time media content (played for the predetermined period of time) for each of the queued viewing devices in the order assigned.

The output stream may include media content from the broadcasting device and/or multiple viewing devices, stitched together and dynamically combined to appear seamless. On a viewing device, the output stream may be paused to avoid viewing undesired content. When resumed, the output stream is still real-time, with the undesired content skipped over (edited out).

The media content of the broadcasting device may be cached or otherwise stored locally on the broadcasting device (or an invited viewing device), e.g., when the device determines that the network cannot be accessed (e.g., in the absence of mobile data and WiFi services), for later broadcasting.

With reference to FIG. 1, a schematic block diagram illustrating an example of a broadcasting system 100 according various embodiments. The broadcasting system 100 may include at least a broadcasting device 110, one or more viewing devices 120 (e.g., a first viewing device 120a, a second viewing device 120b, . . . , and a nth viewing device 120n), server 140, and storage cluster 145. Each of the broadcasting device 110, viewing devices 120, server 140, and storage cluster 145 may be connected to one another through a network 130.

In some embodiments, the broadcasting device 110 may be associated with (i.e., used by) a broadcaster who broadcasts media content initially. As used herein, "media content" may refer to video content, audio content, or both. Each of the viewing devices 120 may be associated with (i.e., used by) a viewer who views the broadcasted media content initially. In other words, the viewers are generally the audience of the broadcaster. However, as described in more details herein, viewers (through the corresponding viewing devices 120) may nevertheless participate in the streaming by having media contents captured by the viewing devices 120 to be stitched to the output stream.

In various embodiments, the server 140 may represent a "command center" in which control (e.g., stitching), management, and/or distribution of media content (originating from the broadcasting device 110 and/or one or more of the viewing devices 120) to the viewing devices 120. The storage cluster 145 may be operatively coupled to the server 140.

In some embodiments, the storage cluster 145 may be connected to the server 140 through the network 130. In other embodiments, the storage cluster 145 may be connected to the server 140 in through another suitable network. In particular embodiments, the storage cluster 145 may be capable of storing a greater amount of information and provide a greater level of security against unauthorized access to stored information, than a memory (e.g., a memory 420 of FIG. 4) of the server 140. The storage cluster 145 may include any suitable electronic storage device or system, including, but not limited to, Random Access Memory (RAM), Read Only Memory (ROM), floppy disks, hard disks, dongles, or other Recomp Sensory Board (RSB) connected memory devices, or the like. In further embodiments, the storage cluster 145 may be connected to the broadcasting device 110 or the viewing devices through the network 130 for storing data (e.g., media content originating from these devices).

In some embodiments, the network 130 may allow data communication between the server 140, the broadcasting device 110, the viewing devices 120, and/or the storage cluster 145. The network 130 may be a wide area communication network, such as, but not limited to, the Internet, or one or more Intranets, local area networks (LANs), Ethernet networks, metropolitan area networks (MANs), a wide area network (WAN), combinations thereof, or the like. The network 130 may also be a mobile data network such as, but not limited to, a 3G network, Long Term Evolution (LTE) network, 4G network, or the like. In particular embodiments, the network 130 may represent one or more secure networks configured with suitable security features, such as, but not limited to firewalls, encryption, or other software or hardware configurations that inhibits access to network communications by unauthorized personnel or entities.

The broadcasting device 110 may capture audiovisual data (e.g., media content) of a broadcaster's view 115. One or more of the viewing devices 120 (e.g., the first viewing device 120a) may likewise capture audiovisual data of a viewer's view (e.g., the first viewer's view 125a).

Figure 2:
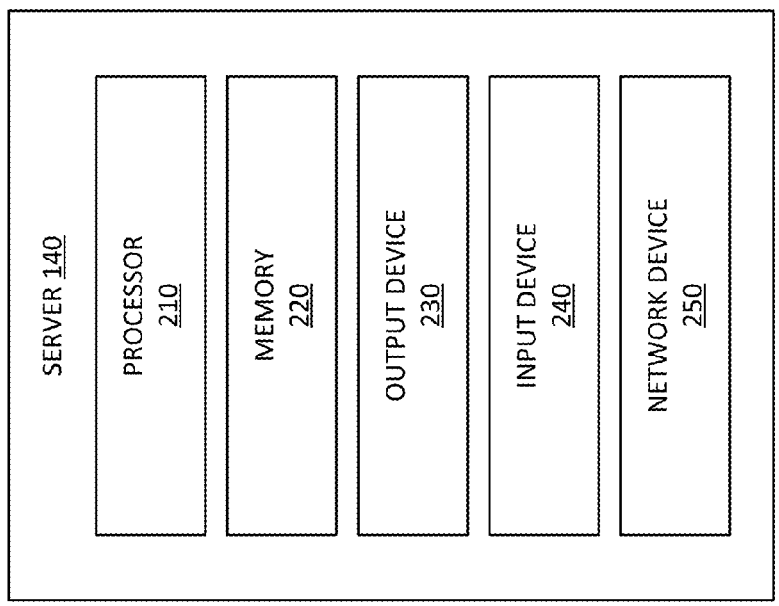
FIG. 2 is a block diagram illustrates an example of a server (as represented in FIG. 1) according to various embodiments.

FIG. 2 is a block diagram illustrating an example of the server 140 (as represented in FIG. 1) according to various embodiments. Referring to FIGS. 1-2, the server 140 may include at least one processor 210, memory 220 operatively coupled to the processor 210, at least one output device 230, at least one input device 240, and at least one network device 250. In some embodiments, the server 140 may include a desktop computer, mainframe computer, laptop computer, pad device, smart phone device or the like, configured with hardware and software to perform operations described herein. For example, the server 140 may include a typical desktop PC or Apple™ computer devices, having suitable processing capabilities, memory, user interface (e.g., display and input) capabilities, and communication capabilities, when configured with suitable application software (or other software) to perform operations described herein. Thus, particular embodiments may be implemented, using processor devices that are often already present in many business and organization environments, by configuring such devices with suitable software processes described herein. Accordingly, such embodiments may be implemented with minimal additional hardware costs. However, other embodiments of the server 140 may include to dedicated device hardware specifically configured for performing operations described herein.

The processor 210 may include any suitable data processing device, such as a general-purpose processor (e.g., a microprocessor), but in the alternative, the processor 210 may be any conventional processor, controller, microcontroller, or state machine. The processor 210 may also be implemented as a combination of computing devices, e.g., a combination of a Digital Signal Processor (DSP) and a microprocessor, a plurality of microprocessors, at least one microprocessors in conjunction with a DSP core, or any other such configuration. The processor 210 may be configured to perform features and functions of the server 140 as described herein.

The memory 220 may be operatively coupled to the processor 210 and may include any suitable device for storing software and data for controlling and use by the processor 210 to perform operations and functions described herein. The memory 220 may include, but not limited to, a RAM, ROM, floppy disks, hard disks, dongles, or other RSB connected memory devices, or the like.

In particular embodiments, the server 140 may include at least one output device 230. The output device 230 may include any suitable device that provides a human-perceptible visible signal, audible signal, tactile signal, or any combination thereof, including, but not limited to a touchscreen, Liquid Crystal Display (LCD), Light Emitting Diode (LED), Cathode Ray Tube (CRT), plasma, or other suitable display screen, audio speaker or other audio generating device, combinations thereof, or the like.

In some embodiments, the server 140 may include at least one input device 240 that provides an interface for personnel (such as service entity employees, technicians, or other authorized users) to access the broadcasting system 100 (e.g., the server 140 and the further data storage devices such as the storage cluster 145, if any) for servicing, monitoring, generating reports, communicating with the broadcasting device 110 or the viewing devices 120, and/or the like. The input device 240 may include any suitable device that receives input from a user including, but not limited to, one or more manual operator (such as, but not limited to a switch, button, touchscreen, knob, mouse, keyboard, keypad, slider or the like), microphone, camera, image sensor, or the like.

The network device 250 may be configured for connection with and communication over the network 130. The network device 250 may include interface software, hardware, or combinations thereof, for connection with and communication over the network 130. The network device 250 may include at least one wireless receiver, transmitter, and/or transceiver electronics coupled with software to provide a wireless communication link with the network 130 (or with a network-connected device). In particular embodiments, the network device 250 may operate with the processor 210 for providing wired or wireless communication functions such as transmitting and receiving as described herein. The network device 250 may provide communications in accordance with typical industry standards, such as, but not limited the Internet, or one or more Intranets, LANs) Ethernet networks, MANs, WANs, 3G network, LTE network, 4G network, or the like.

Figure 3:
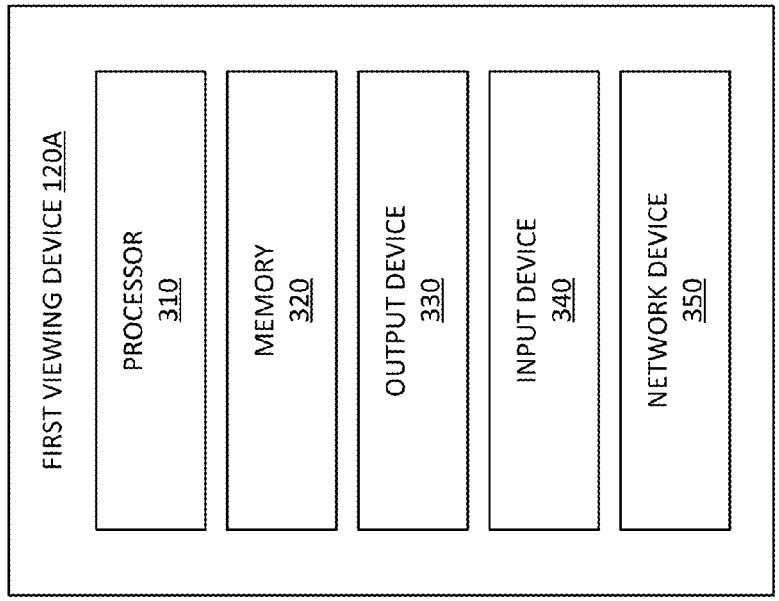
FIG. 3 is a block diagram illustrates an example of a first viewing device (as represented in FIG. 1) according to various embodiments.

FIG. 3 is a block diagram illustrating an example of the first viewing device 120a (as represented in FIG. 1) according to some embodiments. Referring to FIGS. 1-3, each of the viewing devices 120 may be a device such as, but not limited to, described with respect to the first viewing device 120a. The first viewing device 120a may include at least one processor 310, memory 320 operatively coupled to the processor 310, at least one output device 330, at least one input device 340, and at least one network device 350.

The processor 310 may include any suitable data processing device, such as a general-purpose processor (e.g., a microprocessor), but in the alternative, the processor 310 may be any conventional processor, controller, microcontroller, or state machine. The processor 310 may also be implemented as a combination of computing devices, e.g., a combination of a DSP and a microprocessor, a plurality of microprocessors, at least one microprocessors in conjunction with a DSP core, or any other such configuration. The processor 310 may be configured to perform features and functions of the first viewing device 120*a* as described herein.

The memory 320 may be operatively coupled to the processor 310 and may include any suitable device for storing software and data for controlling and use by the processor 310 to perform operations and functions described herein. The memory 310 may include, but not limited to, a RAM, ROM, floppy disks, hard disks, dongles, or other RSB connected memory devices, or the like.

The output device 330 may include any suitable device that provides a human-perceptible visible signal, audible signal, tactile signal, or any combination thereof, including, but not limited to a touchscreen, LCD, LED, CRT, plasma, or other suitable display screen, audio speaker or other audio generating device, combinations thereof, or the like. Particularly, the output device 330 may be configured to output audiovisual content data (received from the server 140 via the network 130) to a viewer (e.g., a first viewer) using the first viewing device 120*a*.

The input device 340 may provide an interface to receive user input of the first viewer. The input device 340 may include any suitable device that receives input from the first viewer including, but not limited to one or more manual operator (such as, but not limited to a switch, button, touchscreen, knob, mouse, keyboard, keypad, slider or the like), microphone, camera, image sensor, or the like. Particularly, the input device 340 may be configured to capture audiovisual content (e.g., first viewer content corresponding to the first viewer's view 125*a*) to be transmitted to the server 140.

The network device 350 may be configured for connection with and communication over the network 130. The network device 350 may include interface software, hardware, or combinations thereof, for connection with and communication over the network 130. The network device 350 may include at least one wireless receiver, transmitter, and/or transceiver electronics coupled with software to provide a wireless communication link with the network 130 (or with a network-connected device). In particular embodiments, the network device 350 may operate with the processor 310 for providing wired or wireless communication functions such as transmitting and receiving as described herein. The network device 350 may provide communications in accordance with typical industry standards, such as, but not limited the Internet, or one or more Intranets, LANs Ethernet networks, MANs, WANs, 3G network, LTE network, 4G network, or the like.

Figure 4:
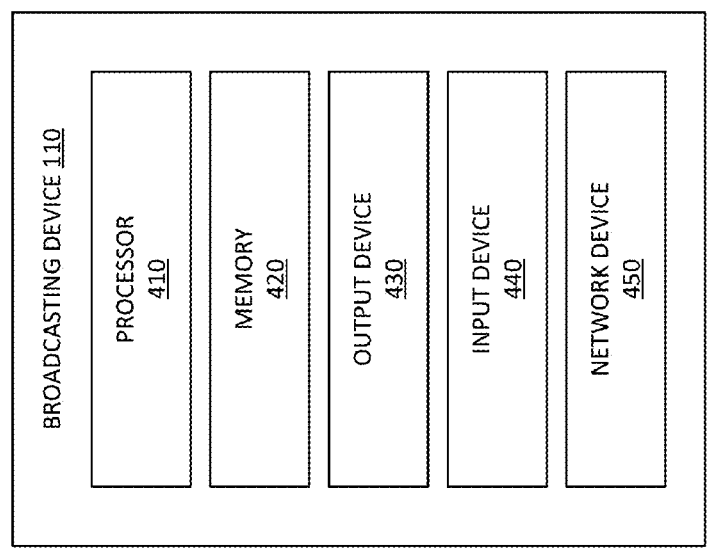
FIG. 4 is a block diagram illustrates an example of a broadcasting device (as represented in FIG. 1) according to various embodiments.

FIG. 4 is a block diagram illustrating an example of the broadcasting device 110 (as represented in FIG. 1) according to some embodiments. Referring to FIGS. 1-4, the broadcasting device 110 may include at least one processor 410, memory 420 operatively coupled to the processor 410, at least one output device 430, at least one input device 440, and at least one network device 450.

The processor 410 may include any suitable data processing device, such as a general-purpose processor (e.g., a microprocessor), but in the alternative, the processor 410 may be any conventional processor, controller, microcontroller, or state machine. The processor 410 may also be implemented as a combination of computing devices, e.g., a combination of a DSP and a microprocessor, a plurality of microprocessors, at least one microprocessors in conjunction with a DSP core, or any other such configuration. The processor 410 may be configured to perform features and functions of the broadcasting device 110 as described herein.

The memory 420 may be operatively coupled to the processor 410 and may include any suitable device for storing software and data for controlling and use by the processor 410 to perform operations and functions described herein. The memory 410 may include, but not limited to, a RAM, ROM, floppy disks, hard disks, dongles, or other RSB connected memory devices, or the like.

The output device 430 may include any suitable device that provides a human-perceptible visible signal, audible signal, tactile signal, or any combination thereof, including, but not limited to a touchscreen, LCD, LED, CRT, plasma, or other suitable display screen, audio speaker or other audio generating device, combinations thereof, or the like. Particularly, the output device 430 may be configured to output audiovisual content data (received from the server 140 via the network 130) to a broadcaster using the broadcasting device 110.

The input device 440 may provide an interface to receive user input of the broadcaster. The input device 340 may include any suitable device that receives input from the first viewer including, but not limited to one or more manual operator (such as, but not limited to a switch, button, touchscreen, knob, mouse, keyboard, keypad, slider or the like), microphone, camera, image sensor, or the like. Particularly, the input device 440 may be configured to capture audiovisual content (e.g., broadcaster content corresponding to the broadcaster's view 115) to be transmitted to the server 140.

The network device 450 may be configured for connection with and communication over the network 130. The network device 450 may include interface software, hardware, or combinations thereof, for connection with and communication over the network 130. The network device 450 may include wireless receiver, transmitter, and/or transceiver electronics coupled with software to provide a wireless communication link with the network 130 (or with a network-connected device). In particular embodiments, the network device 450 may operate with the processor 410 for providing wired or wireless communication functions such as transmitting and receiving as described herein. The network device 450 may provide communications in accordance with typical industry standards, such as, but not limited the Internet, or one or more Intranets, LANs Ethernet networks, MANs, WANs, 3G network, LTE network, 4G network, or the like.

In some embodiments, the first viewing device 120*a* (i.e., each of the viewing devices 120) and the broadcasting device 110 may include a mobile phone (such as, but not limited to an iPhone®, an Android® phone, or the like) or other mobile phone with suitable processing capabilities. Typical modern mobile phone devices include telephone communication electronics as well as some processor electronics, one or more output devices and a touchscreen and/or other input device, such as, but not limited to described herein. Particular embodiments employ mobile phones, commonly referred to as smart phones, that have relatively advanced processing, input and display capabilities in addition to telephone communication capabilities. However, the first viewing device 120*a* (i.e., each of the viewing devices 120) and the broadcasting device 110, in further embodiments, may include any suitable type of mobile phone and/or other type of portable electronic communication device, such as, but not limited to, an electronic smart pad device (such as, but not limited to an iPad™), a portable laptop computer, or the like.

In some embodiments, the first viewing device 120a (i.e., each of the viewing devices 120) and the broadcasting device 110 may have existing hardware and software for telephone and other typical wireless telephone operations, as well as additional hardware and software for providing functions as described herein. Such existing hardware and software includes, for example, one or more input devices (such as, but not limited to keyboards, buttons, touchscreens, cameras, microphones, environmental parameter or condition sensors), display devices (such as, but not limited to electronic display screens, lamps or other light emitting devices, speakers or other audio output devices), telephone and other network communication electronics and software, processing electronics, electronic storage devices and one or more antennae and receiving electronics for receiving various signals. In such embodiments, some of that existing electronics hardware and software may also be used in the systems and processes for functions as described herein.

Accordingly, such embodiments can be implemented with minimal additional hardware costs. However, other embodiments relate to systems and process that are implemented with dedicated device hardware specifically configured for performing operations described herein. Hardware and/or software for the functions may be incorporated in the first viewing device 120a (i.e., each of the viewing devices 120) and the broadcasting device 110 during manufacture, for example, as part of the original manufacturer's configuration. In further embodiments, such hardware and/or software may be added to the first viewing device 120a (i.e., each of the viewing devices 120) and the broadcasting device 110, after original manufacture, such as by, but not limited to, installing one or more software applications.

Figure 5:
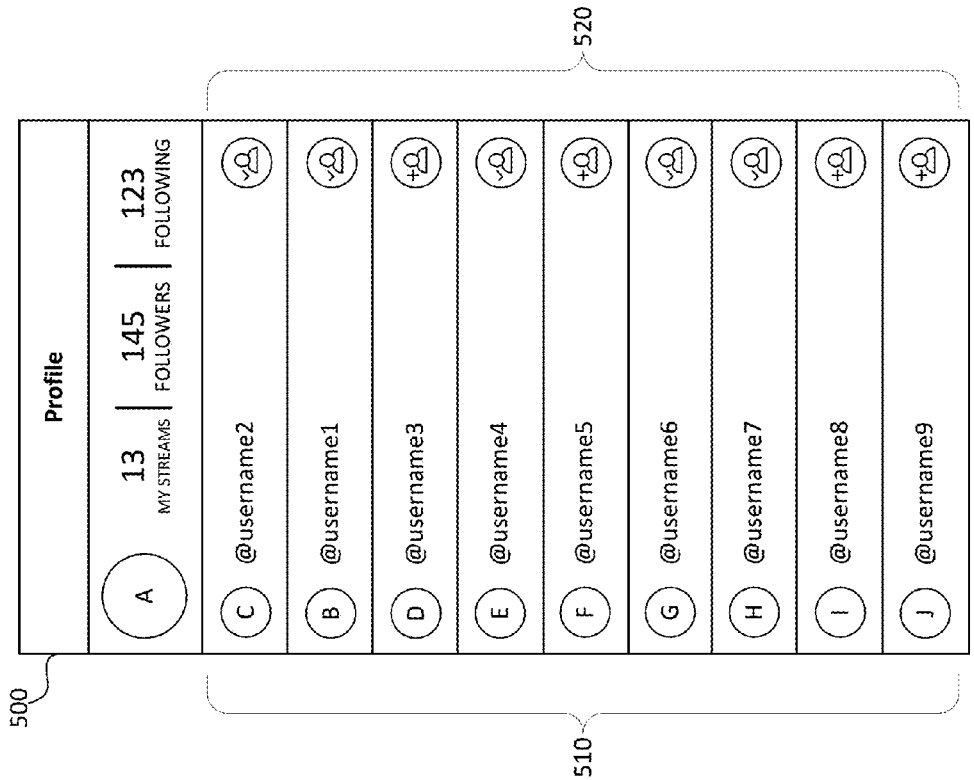
FIG. 5 is an example of a display screen illustrating a social networking aspect of a streaming platform according to various embodiments.

FIG. 5 is an example of a display screen 500 illustrating a social networking aspect of a streaming platform according to various embodiments. Referring to FIGS. 1-5, the display screen 500 may displayed by the output device 330 of the first viewing device 120a and the output device 430 of the broadcasting device 110. Each of the viewing devices 120 may also become a broadcasting device (such as, but not limited to, the broadcasting device 110) when the user decides to broadcast content. The display screen 500 may include contacts 510 to broadcast the streams to. The contacts 510 may be obtained from a contact list (e.g., a phone book) stored locally within the device, from a linked social media site (e.g., Facebook, Twitter, or the like), or from a social media feature of the streaming platform. Contacts 510 from the contact list may be invited to view the broadcast, to be notified of the broadcast, or to take over the broadcast, as described herein. User interactive elements 520 (or soft switches, actuators, operators, or the like) may be provided in the display screen 500 for performing such features.

Figure 6:
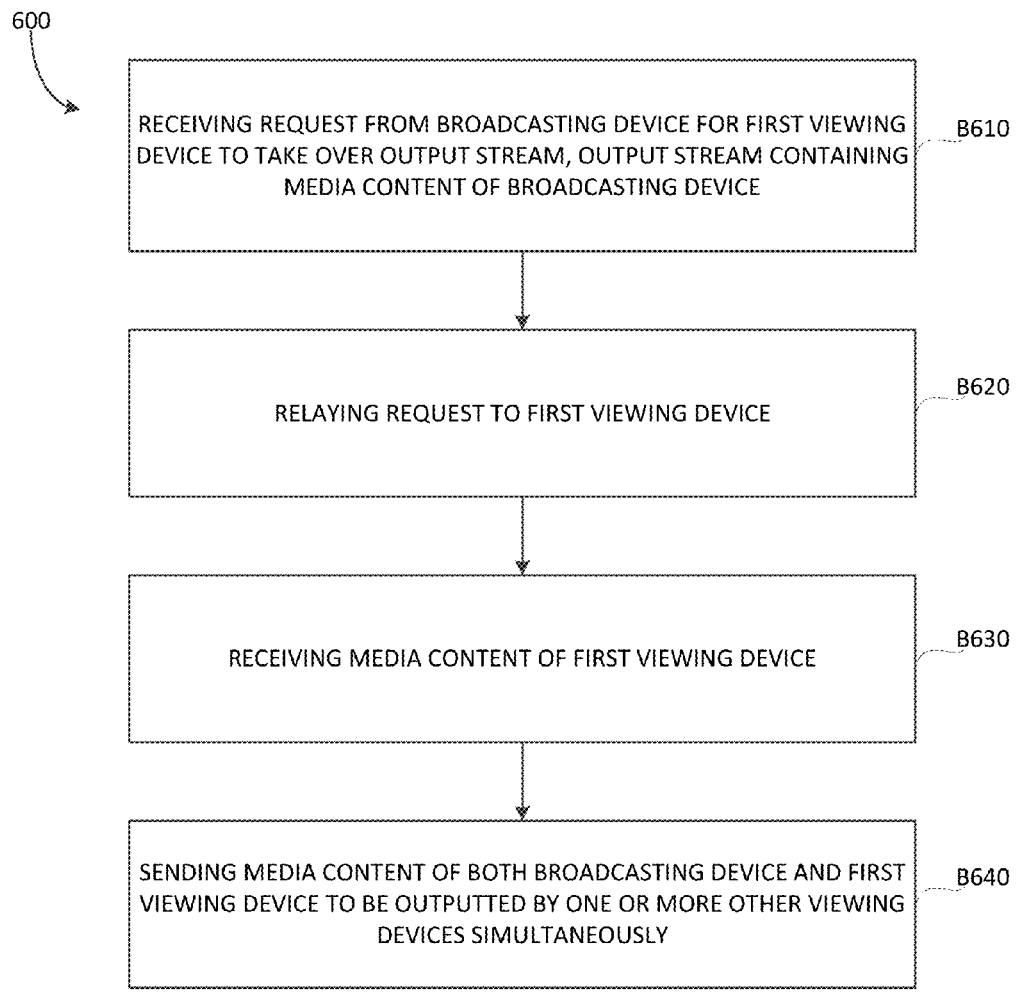
FIG. 6 is a process flowchart illustrating an interactive broadcasting method according to various embodiments.

FIG. 6 is a process flowchart illustrating an interactive broadcasting method 600 according to various embodiments. Referring to FIGS. 1-6, the interactive broadcasting method 600 may be performed by the processor 210 of the server 140 according to some embodiments. Initially, the server 140 may output an output stream to the viewing devices 120 (including the first viewing device 120a) containing media content of only the broadcasting device 110. At block B610, the server 140 may receive a request from the broadcasting device 110 for the first viewing device 120a to take over the output stream. The first viewing device 120a may be used by a first viewer within a social network of the broadcaster. At block B620, the server 140 may relay the request to the first viewing device 120a. For example, the server 140 may interface with the social network to provide notification to the first viewing device 120a.

Subsequently, the server 140 may receive an acceptance notification from the first viewing device 120a indicating that the first viewer has accepted taking over the output stream. At block B630, the server 140 may receive media content of the first viewing device 120a. In some embodiments, the server 140 may receive the media content of the first viewing device 120a in response to the first viewing device 120a accepting the takeover request. At this point, the server 140 may time-align the media content of the broadcasting device 110 and the first viewing device 120a based on, for example, suitable synchronization methods using timestamps, sequence numbers, a combination thereof, and/ or the like.

The time-aligned media content of both the broadcasting device 110 and the first viewing device 120 may be distributed (sent) by the server 140 to viewing devices 120 other than the first viewing device 120a to be outputted simultaneously (or sequentially), at block B640. In other embodiments, the combined media content may be sent to the first viewing device 120a, the broadcasting device 110, or both to be outputted simultaneously.

Alternatively, instead of sending the media content of both the first viewing device 120a and the broadcasting device 110, the server 140 may only send the media content of the first viewing device 120 in response to the acceptance indication received from first viewing device 120, until a termination indication has been received by the server 140.

Figure 7:
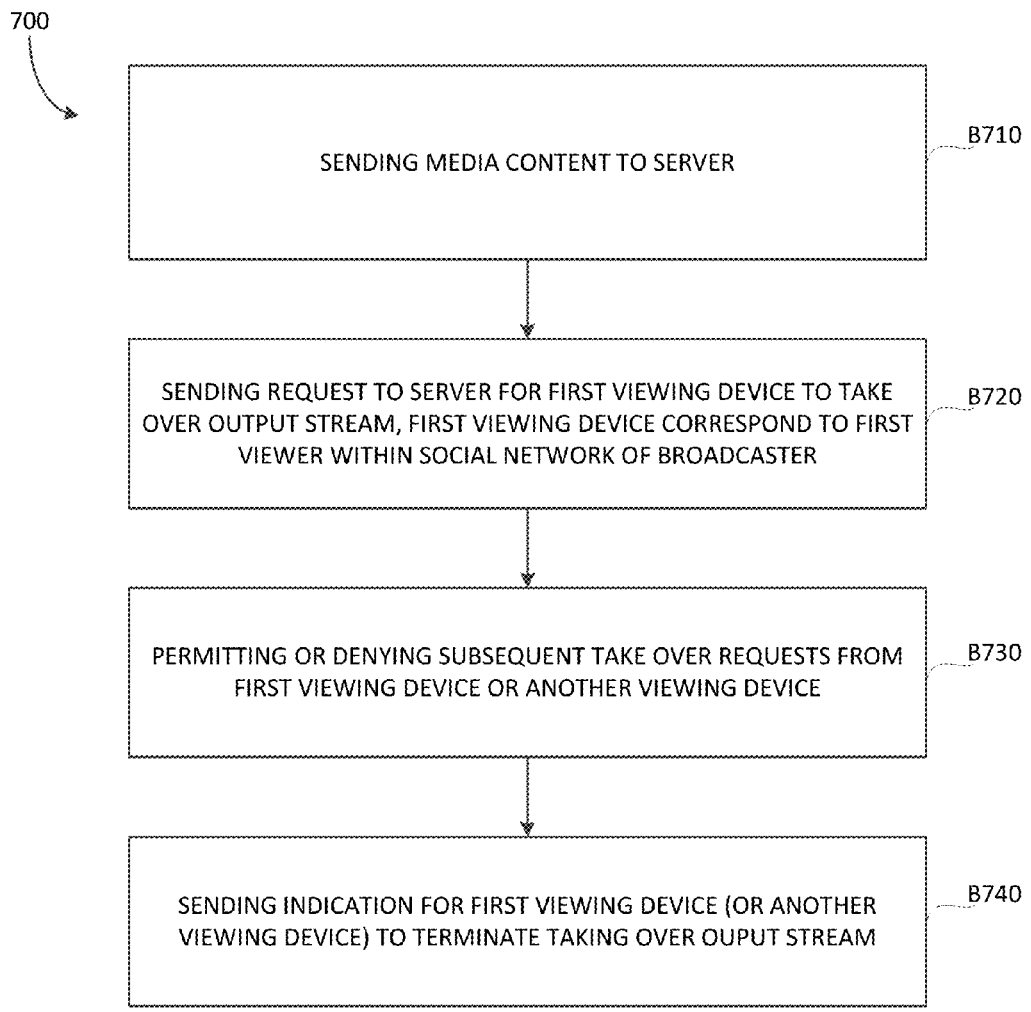
FIG. 7 is a process flowchart illustrating an interactive broadcasting method according to various embodiments.

FIG. 7 is a process flowchart illustrating an interactive broadcasting method 700 according to various embodiments. Referring to FIGS. 1-7, the interactive broadcasting method 700 may be performed by the processor 410 of the broadcasting device 110 according to some embodiments. At block B710, the broadcasting device 110 may send the media content captured by the broadcasting device 110 to the server 140, to be outputted to the viewing devices 120 in the output stream.

At block B720, the broadcasting device 110 may send the request to the server 140 for the first viewing device 120a to take over the output stream. The broadcasting device 110 may receive user input from the broadcaster via the input device 440 regarding which one of the viewing devices 120 to send the takeover request to. The first viewing device 120a may correspond to a first viewer within the social network (such as, but not limited to, shown in the display screen 500) of the broadcaster.

In some embodiments, the broadcasting device 110 may receive a second request from the first viewing device 120a (or from the server 140 which relays the second request from the first viewing device 120a) to have another one of the viewing devices (e.g., the second viewing device 120b) to take over the output stream. When permitted, the second viewing device 120b may request for another one of the viewing devices 120 to take over the output stream, and so on. At block B730, the broadcasting device 110 may permit or deny any subsequent takeover requests by any of the viewing devices 120 requesting to have another one of the viewing devices 120 to take over the output stream. The permission and the denial may be sent to the server 140, which would then time-align and/or combine the media content of the broadcasting device 110 and the permitted one of the viewing devices 120 to be sent to the viewing devices 120.

At block B740, the broadcasting device 110 may send an indication for the first viewing device 120a (or another viewing device currently taking over the output stream) to terminate the takeover. Once the server 140 receives such indication, the media content of any of the viewing devices 120 taking over the output stream may be dropped. The server 140 may once again send media content of only the broadcasting device 110 to the viewing devices 120.

Figure 8:
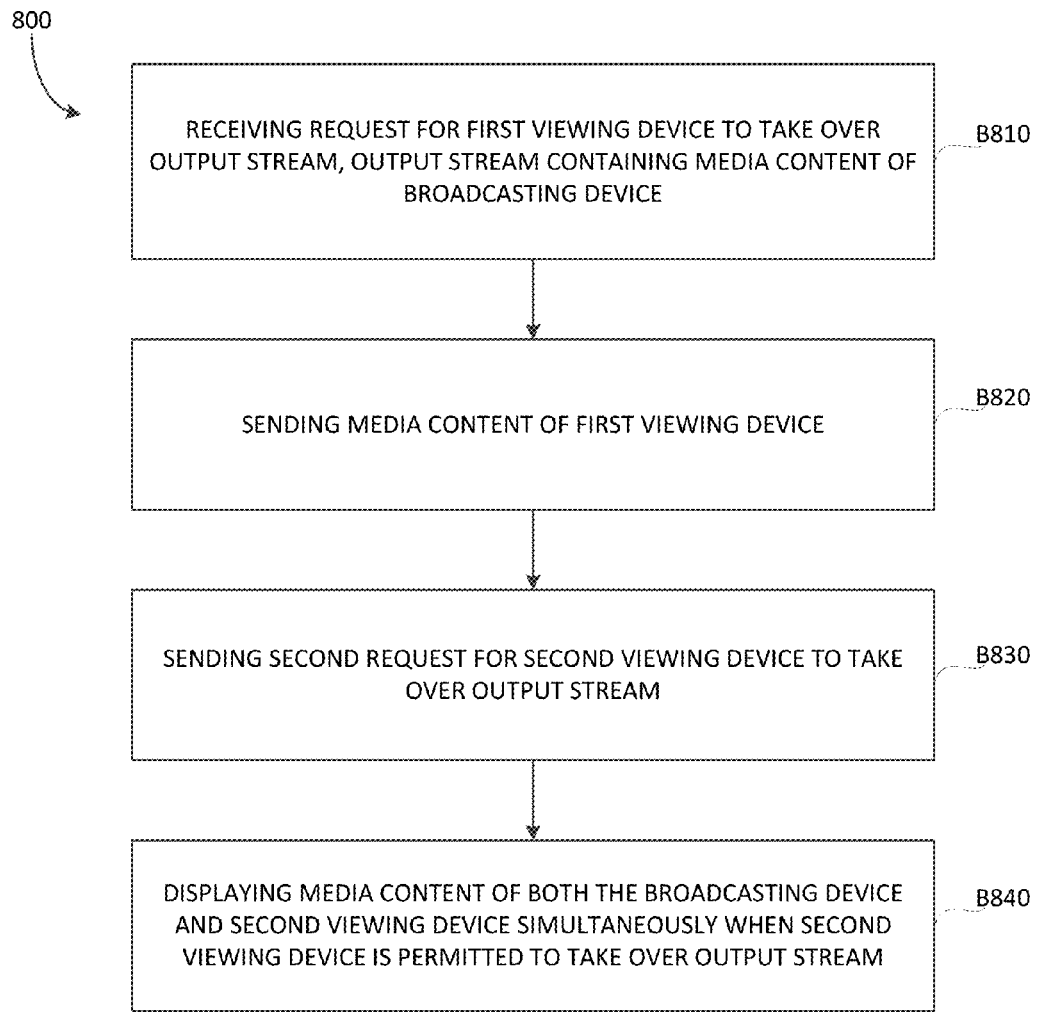
FIG. 8 is a process flowchart illustrating an interactive broadcasting method according to various embodiments.

FIG. 8 is a process flowchart illustrating an interactive broadcasting method 800 according to various embodiments. Referring to FIGS. 1-8, the interactive broadcasting method 800 may be performed by the processor 310 of the first viewing device 120a according to some embodiments. Initially, the first viewing device 120a may be configured to display, via the output device 330, the output stream (containing media content from the broadcasting device 110) received from the server 140. At block B810, the first viewing device 120a may receive the request to take over the output stream from the server 140 (that relays the request from the broadcasting device 110) or from the broadcasting device 110 directly via the network 130. In response, the first viewing device 120a may send the media content of the first viewing device 120a at block B820.

At block B830, the first viewing device 120a may send a second request for the second viewing device 120b to take over the output stream to the server 140 (which may relay the second request to the broadcasting device 110) or to the broadcasting device 110 directly. The second request may be based on user input of the first viewer.

When the server 140 permits such subsequent takeover by the second viewing device 120b, the first viewing device 120a (as well as other viewing devices 120 including or not including the second viewing device 120b) may display media content of both the broadcasting device 110 and the second viewing device 120b simultaneously, at block B840.

Figure 9:
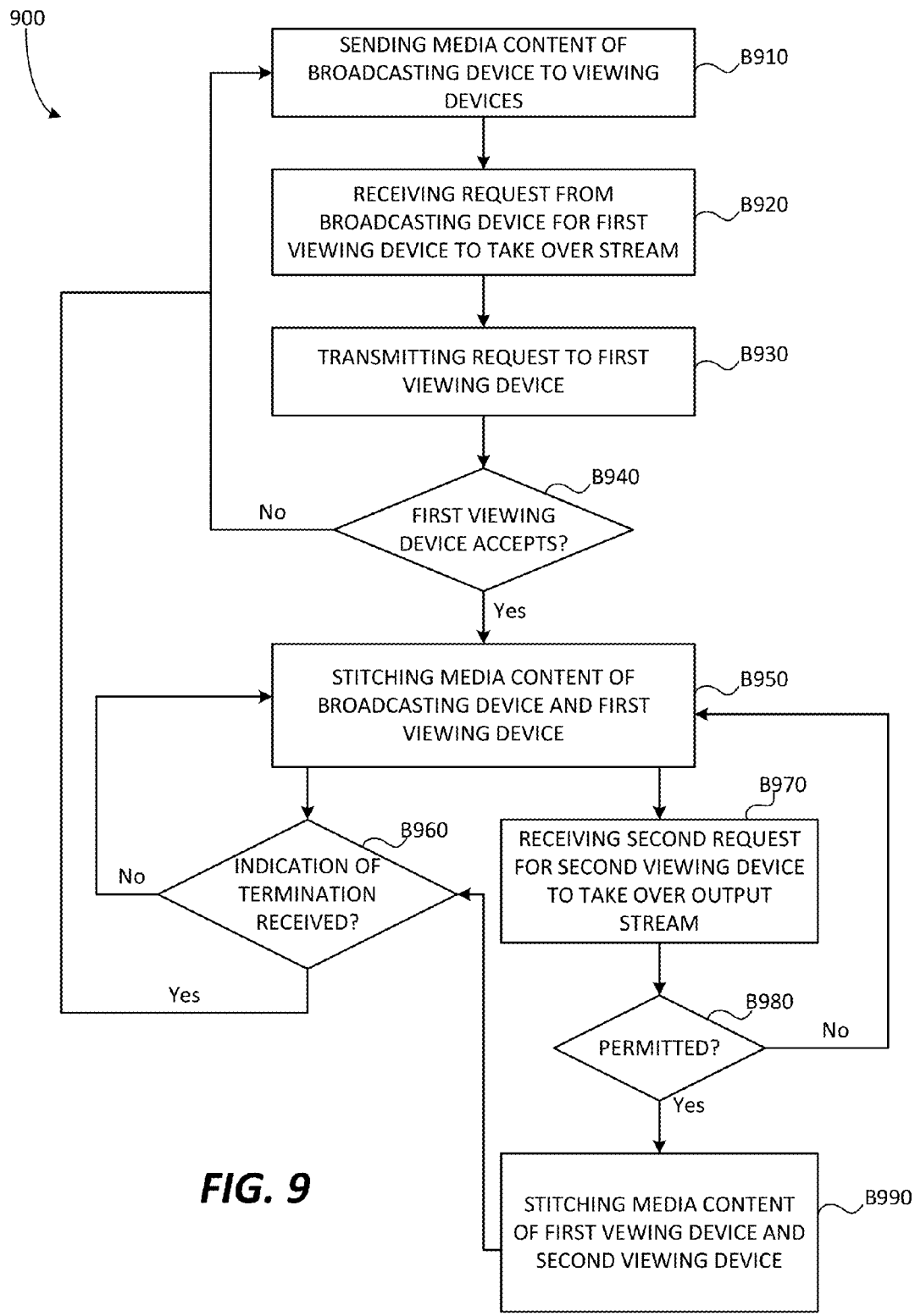
FIG. 9 is a process flowchart illustrating an interactive broadcasting method according to various embodiments.

FIG. 9 is a process flowchart illustrating an interactive broadcasting method 900 according to various embodiments. Referring to FIGS. 1-9, the interactive broadcasting method 900 may be performed by the processor 210 of the server 140 according to some embodiments. At block B910, the server 140 may send media content received from the broadcasting device 110 to the viewing devices 120 as the output stream. At block B920, the server 140 may receive the request from the broadcasting device 110 for the first viewing device 120a to take over the output stream. In response, the server 140 may send the request to the first viewing device 120a, at block B930.

At block B940, the first viewing device 120a may determine whether to accept the takeover request, based on user input of the first viewer. When the first viewer indicates that taking over is not desired, the server 140 may continue to send the media content of the broadcasting device 110 at block B910 (B940: NO). On the other hand, when the first viewer indicates that taking over is desired, the server 140 may stitch the media content of the broadcasting device 110 and the first viewing device 120a at a transition point to transition sending the media content of the broadcasting device 110 to sending the media content of the first viewing device 120a seamlessly, at block B950 (B940: YES). Alternatively, the server 140 may time align the media content of the broadcasting device 110 and the first viewing device 120a, and send the media content of both the broadcasting device 110 and the first viewing device 120a to the viewing devices 120 to be displayed simultaneously.

In some embodiments, the server 140 may determine whether the indication of termination has been received from the broadcasting device 110. When the indication of termination has been received from the broadcasting device 110, the server 140 may drop the media content of the first viewing device 120a and send the media content of only the broadcasting device 110, at block B910 (B960: YES). On the other hand, when the indication of termination has not been received from the broadcasting device 110, the server 140 may continue to send the media content of the first viewing device 120a (or both the broadcasting device 110 and the first viewing device 120a, in the alternative case) to the viewing devices 120, at block B950 (B960: NO). In other embodiments, the first viewing device 120a may itself terminate the takeover, based on user input.

At block B970, the server 140 may receive the second request from the first viewing device 120a for the second viewing device 120b to take over the output stream. The server 140 may forward the second request from the first viewing device 120a to the broadcasting device 110 for approval. When the server 140 receives the permission from the broadcasting device 110, permission has been granted at block B980. When the permission has been granted, the server 140 may stitch the media content of the first viewing device 120a and the second viewing device 120b at another transition point in the output stream to transition sending the media content of the first viewing device 120a to sending the media content of the second viewing device 120b, at block B990 (B980: YES). Alternatively, the server 140 may time-align the media content of one or more of the broadcasting device 110, the first viewing device 120a, or the second viewing device 120b for sending to the viewing devices 120. On the other hand, when then permission has not been granted, the server 140 may continue to send the media content of both the broadcasting device 110 and the first viewing device 120a to the viewing devices 120, at block B950 (B980: NO).

Though described with respect to the first and the second viewing devices 120a, 120b, additional viewing devices may be invited by another viewing device to take over the output stream, subject to the permission of the broadcasting device 110. For example, the second viewing device 120b may subsequently invite a third viewing device (not shown), and the third viewing device may then invite a fourth viewing device (not shown), and so forth.

However, when any of the viewing devices 120 takes over the output stream, the broadcasting device 110 may send the indication of termination to the server 140 to return the output stream back to containing the media content of only the broadcasting device 110 (e.g., at block B960).

Figure 10:
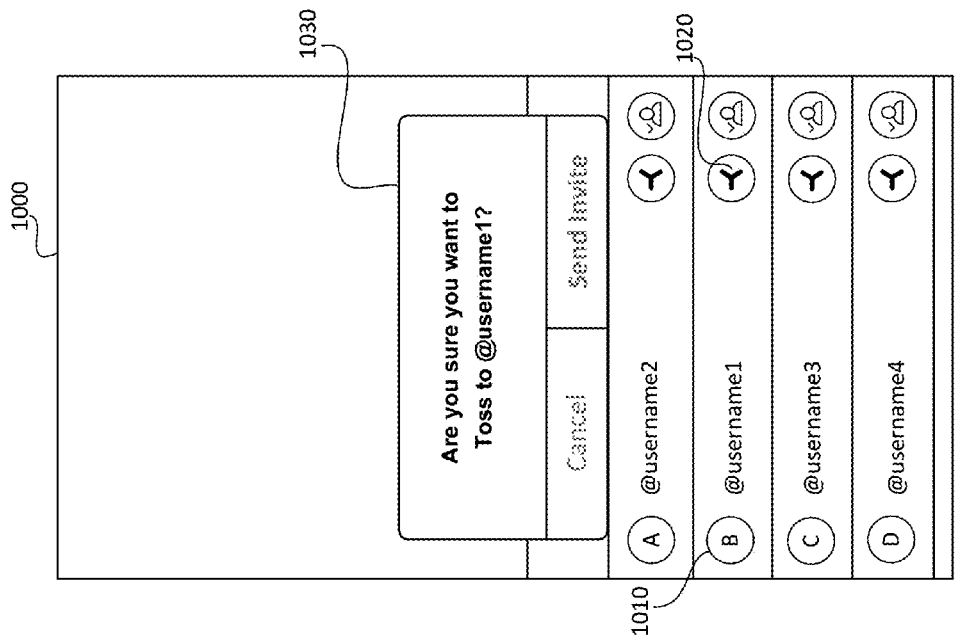
FIG. 10 is an example of a display screen for requesting the first viewer device to take over the output stream according to various embodiments.

FIG. 10 is an example of a display screen 1000 for requesting the first viewer device 120a to take over the output stream according to various embodiments. Referring to FIGS. 1-10, the display screen 1000 may be displayed by the output device 430 of the broadcasting device 110. The display screen 1000 may include a first entry 1010 corresponding to the first viewer. One or more entries (such as, but not limited to, the first entry 1010) may be displayed in the display screen 1000 for selection by the broadcaster, via the input device 440. A first user interactive element 1020 (or soft switch, actuator, operator, or the like) may be presented such that, when selected via the input device 440, may trigger sending of the request to take over to the first viewing device 120a associated with the first entry 1010. A confirmation window 1030 may be displayed to verify that the broadcaster meant to send the request to the first viewing device 120a.

Figure 11:
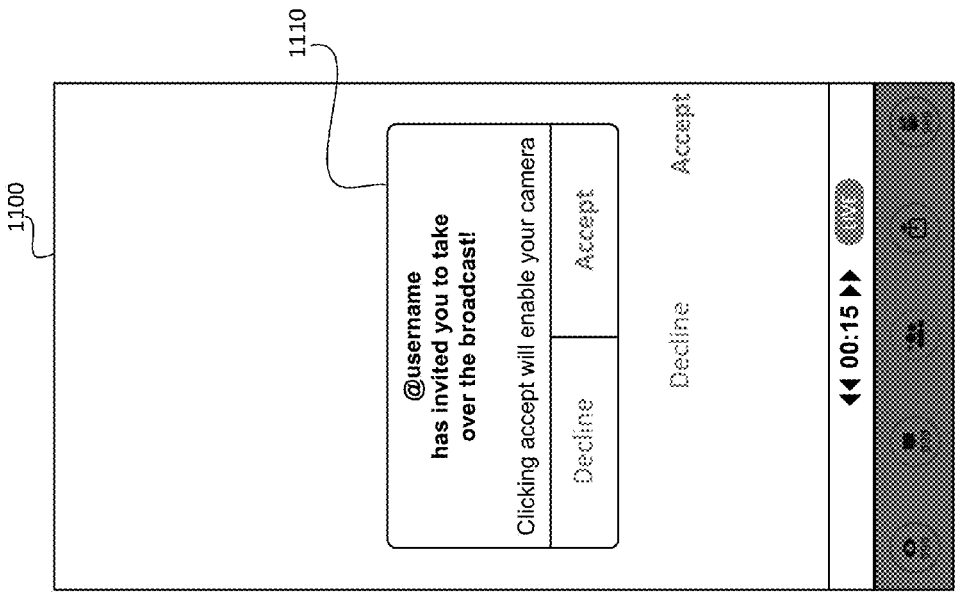
FIG. 11 is an example of a display screen for responding to the takeover request according to various embodiments.

FIG. 11 is an example of a display screen 1100 for responding to the takeover request according to various embodiments. Referring to FIGS. 1-11, the display screen 1100 may be displayed by the output device 330 of the first viewing device 120*a*. When the server 140 relays the takeover request to the first viewing device 120*a*, the first viewing device 120*a* may display the display screen 1100 to the first viewer. The display screen 1100 may include a notification window 1110 having at least one user interactive element, soft switch, actuator, operator, or the like for accepting or declining the takeover request.

Figure 12:
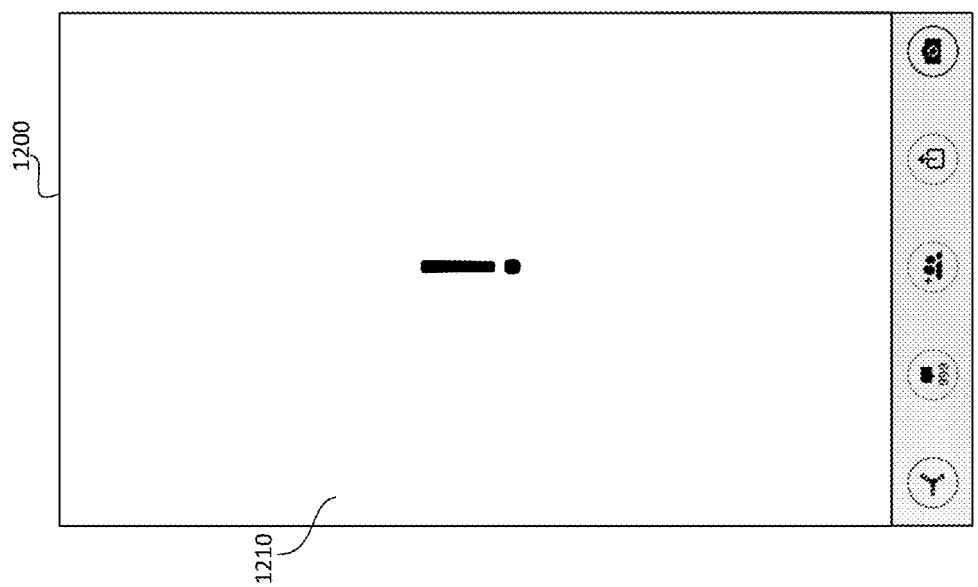
FIG. 12 is an example of a display screen displaying media content of the first viewing device according to various embodiments.

FIG. 12 is an example of a display screen 1200 displaying media content of the first viewing device 120*a* (the first viewer's view 125*a*) according to various embodiments. Referring to FIGS. 1-12, the display screen 1200 may be displayed by one or more or all of the output device 330 of the first viewing device 120*a*, by the output device 330 of other viewing devices 120, and/or by output device 430 of the broadcasting device 110. The display screen 1200 may show takeover media content 1210 which may correspond to the first viewer's view 125*a*. The output devices 330 of the viewing devices 120 may output an instant transition from the original media content (e.g., the broadcaster's view 115) to the takeover media content 1210. In other words, the original media content and the takeover media content 1210 may be stitched together to form a seamless, continuous video.

In particular embodiments, a Hypertext Transfer Protocol (HTTP) Live Streaming (HLS) protocol may be modified to transparently change the inbound stream from one source (e.g., the broadcasting device 110) to another source (e.g., the first viewing device 120*a*). Media content from both sources may be stored in the storage cluster 145. The HLS protocol may be used to appropriately append the media content from the another source to the media content of the one source, thus allowing the transparent switchover.

Alternatively, the display screen 1200 may include the takeover media content 1210 as well as the original media content (e.g., the broadcaster's view 115) from the broadcasting device 110, in a split screen or overlapping format. The broadcasting device 110 may receive user input (via a sliding bar or other suitable user interactive element, soft switch, actuator, operator, or the like) related to adjusting a position and/or size of a screen playing the media content of the first viewing device 120*a*. Additional embodiments include enabling the broadcaster to adjust a position and/or size of a screen playing the media content of the broadcasting device 110 and/or at least one additional screen playing the media content of another additional one of the viewing devices 120 (in the case in which media content of the broadcasting device 110 and two or more of the viewing devices 120 are playing at the same time). The broadcasting device 110 may send such adjustment indications to the server 140. The server 140 may then distribute such adjustment indications to the viewing devices 120. The position and/or size of the screens described herein may accordingly be adjusted by each of the viewing devices 120 according to the adjustment indication received.

Figure 13:
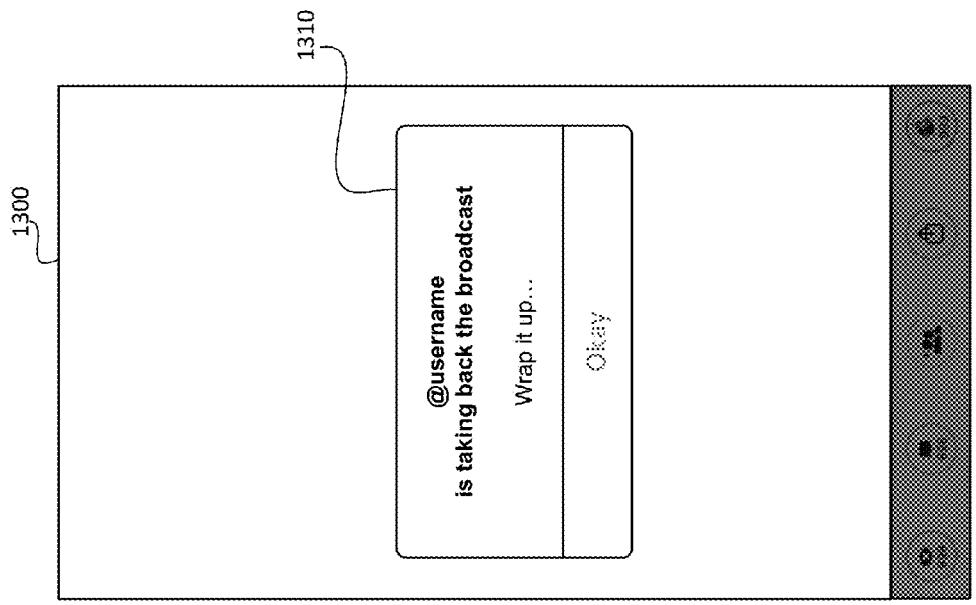
FIG. 13 is an example of a display screen displaying a termination message according to various embodiments.

FIG. 13 is an example of a display screen 1300 displaying a termination message 1310 according to various embodiments. Referring to FIGS. 1-13, the display screen 1300 may be displayed by the output device 330 of the first viewing device 120*a* or of any other viewing devices 120 taking over the output stream. In response to receiving the indication of termination from the server 140 or from the broadcasting device 110 directly, the first viewing device 120*a* may be configured to display the termination message 1310 to notify the first viewer that the takeover is ending or will end soon.

Figure 14:
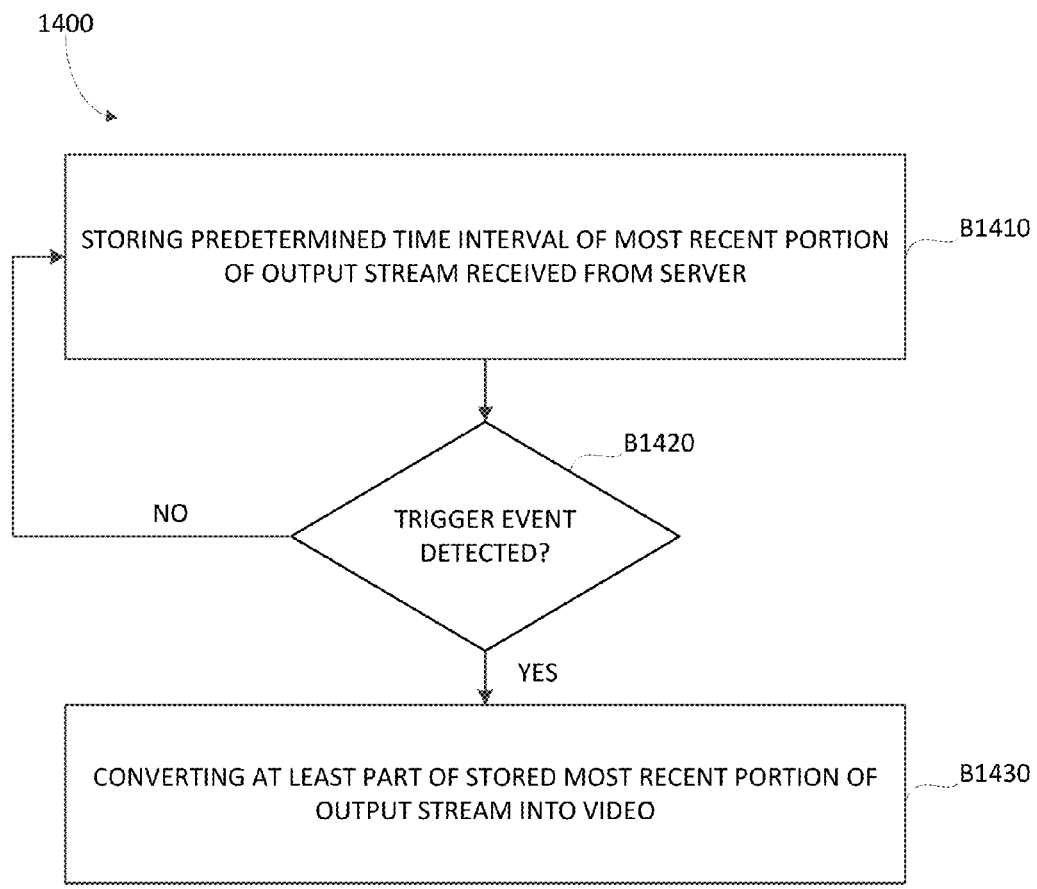
FIG. 14 is a process flowchart illustrating a stream content sharing method according to various embodiments.

FIG. 14 is a process flowchart illustrating a stream content sharing method 1400 according to various embodiments.

Referring to FIGS. 1-14, the streaming content sharing method 1400 may be performed by the processor 310 of the first viewing device 120*a* (or the processor 310 of each of the viewing devices 120) according to some embodiments. In further embodiments, the streaming content sharing method 1400 may be performed by the processor 410 of the broadcasting device 110.

At block B1410, the first viewing device 120*a* may store a predetermined time interval of a most recent portion of the output stream received from the server 140. Given that the stream may be real-time and continues to accumulate data, the stored portion of the output stream may be constantly updated (e.g., adding the latest frames and deleting earlier frames beyond the predetermined time interval). The most recent portion of the output stream may be stored in the local memory 320 of the first viewing device 120*a*. Alternatively, the most recent portion of the output stream may be stored in any suitable cloud storage or the storage cluster 145, retrievable by the first viewing device 120*a*.

At block B1420, the first viewing device 120*a* may detect a trigger event. The trigger event may be detecting a user input related to retrieving at least a part of the most recent portion. For example, the streaming platform may provide a user interactive element, soft switch, actuator, operator, or the like for accepting the user input to retrieve and/or convert a part of the most recent portion of the output stream for sharing on social media or for permanent storage.

The part may be of a default length (e.g., the predetermined time interval or the entire length of the stored most recent portion) or a user-defined length of time, as indicated via any suitable user interactive element, soft switch, actuator, operator, or the like.

At block B1430, the first viewing device 120*a* may convert the at least a part of the stored, most recent portion of the output stream into a video when the trigger event has been detected (B1420: YES). The first viewing device 120*a* may subsequently share the video on social media or for permanent storage. Otherwise, the first viewing device 120*a* may continue to store the most recent portion per block B1410.

Figure 15:
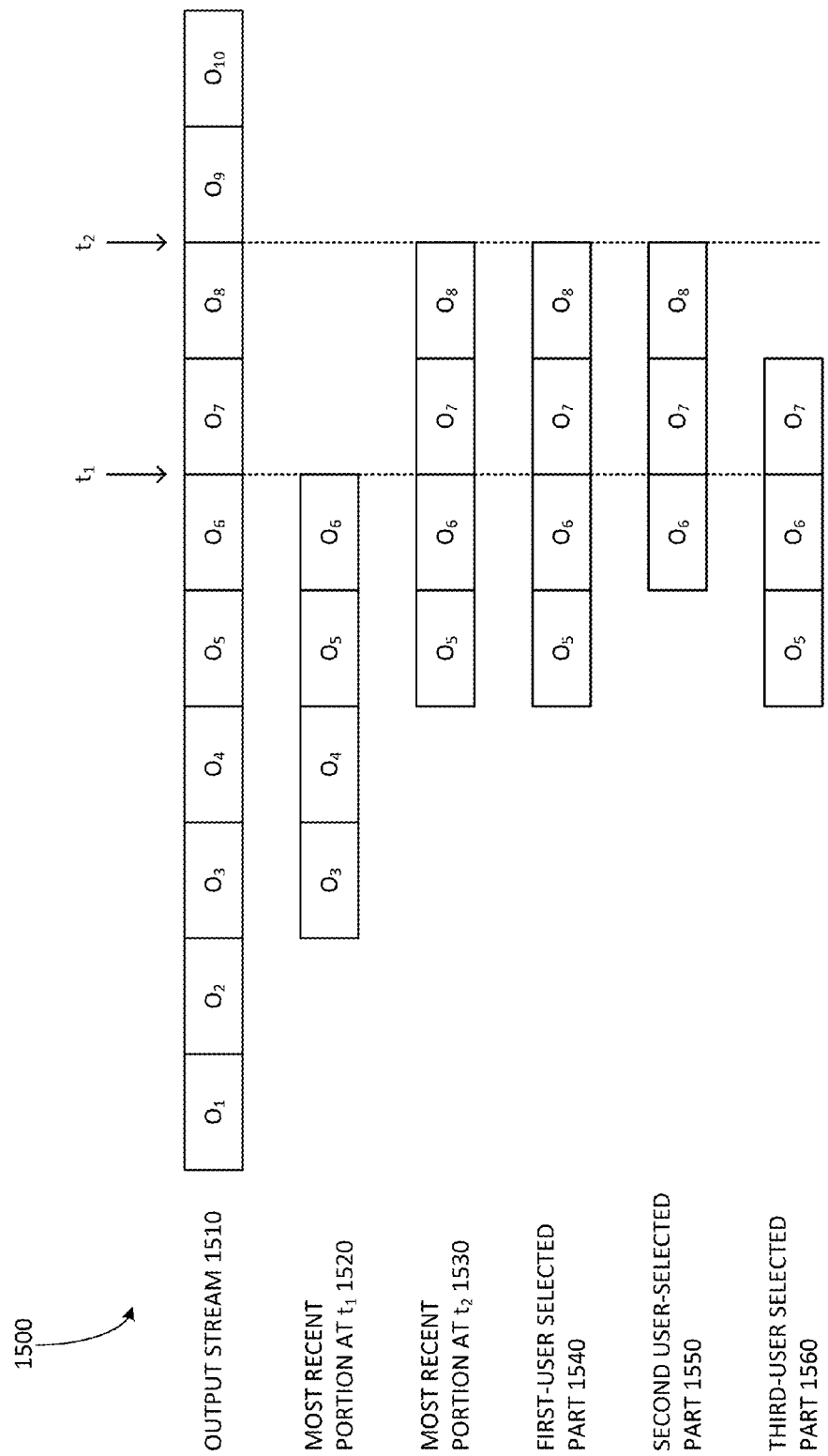
FIG. 15 is a schematic diagram illustrating an example of converting a part of a most recent portion of an output stream according to various embodiments.

FIG. 15 is a schematic diagram 1500 illustrating an example of converting a part of the most recent portion of the output stream according to various embodiments. Referring to FIGS. 1-15, the output stream may include a plurality of segments (e.g., segments $O_1$-$O_{10}$). Each of the segments may include at least one audio or video frame. At time $t_1$, a most recent portion at $t_1$ 1520 may include segments $O_3$-$O_6$. That is assuming, in this non-limiting example, that the predetermined time interval may correspond to 4 segments. At time $t_2$, a most recent portion at $t_2$ 1530 may include segments $O_5$-$O_8$. Segments $O_3$-$O_4$ may be deleted as they are beyond the predetermined time interval (e.g., 4 segments). Segments $O_7$-$O_8$ may be added to the most recent portion at $t_2$ 1530.

In some embodiments, the at least a part of the most recent portion at $t_2$ 1530 may be selected by the viewer of the viewing devices 120. For example, a first user-selected part 1540 (at $t_2$) may be the entirety of the most recent portion at $t_2$ 1530 (e.g., $O_5$-$O_8$). This may be a default option when the viewer does not specify the length of the part of the most recent portion to be converted. A second user-selected part 1550 (at $t_2$) may be the latest of the most recent portion at $t_2$ 1530 (e.g., $O_6$-$O_8$), provided that the viewer wishes to convert three-segment length of the most recent portion at $t_2$ 1530. A third user-selected part 1560 (at $t_2$) may be a part of the most recent portion at $t_2$ 1530 other than the latest part (e.g., $O_5$-$O_7$), provided that the viewer wishes to convert three-segment length of the most recent portion at $t_2$ 1530. The viewer may, via the input device 340 of the first viewing device 120*a*, indicate whether to select the first user-selected part 1540 (or default without any selection), the second user-selected part 1550, or the third user-selected part 1560, for example, at $t_2$.

Figure 16:
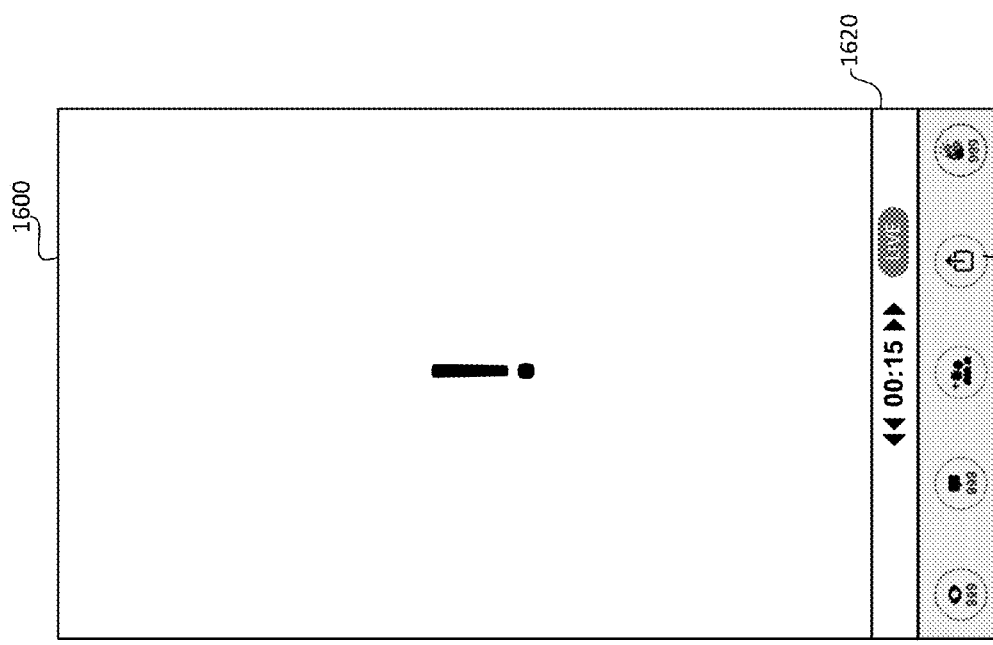
FIG. 16 is an example of a display screen displaying a content sharing feature according to various embodiments.

FIG. 16 is an example of a display screen 1600 displaying a content sharing feature according to various embodiments. Referring to FIGS. 1-16, the display screen 1600 may be displayed by the output device 330 of each of the viewing devices 120 (e.g., the first viewing device 120). The display screen 1600 may include at least one sharing element 1610 configured as a user interactive element, soft switch, actuator, operator, or the like, for triggering (at block B1420) the conversion (at block B1430). A time control window 1620 may allow the viewer to adjust a length of time (of the part of the stored most recent portion) desired to be converted. For example, the time control window 1620 may include at least one user interactive element, soft switch, actuator, operator, or the like for accepting user input related to whether the entire stored most recent portion, the latest part of the stored most recent portion, or another part other than the latest part of the stored most recent portion is desired to be converted.

Figure 17:
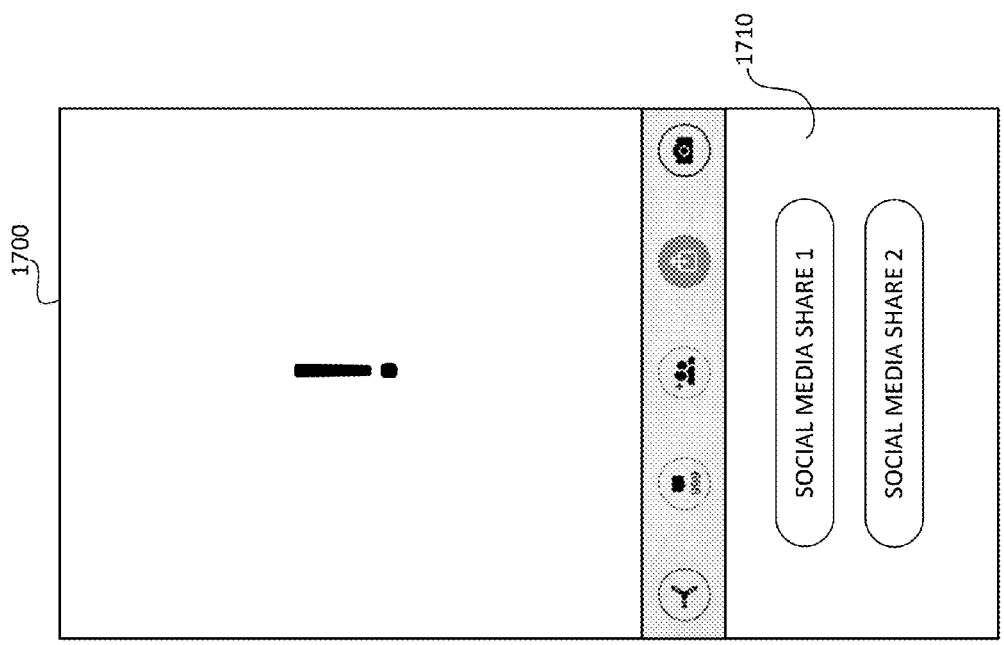
FIG. 17 is an example of a display screen displaying a content sharing feature according to various embodiments.

FIG. 17 is an example of a display screen 1700 displaying a content sharing feature according to various embodiments. Referring to FIGS. 1-17, the display screen 1700 may be displayed by the output device 330 of each of the viewing devices 120 (e.g., the first viewing device 120). The display screen 1700 may include a social network element 1710 for sharing the converted video (per block B1430) to the viewer's social network.

Figure 18:
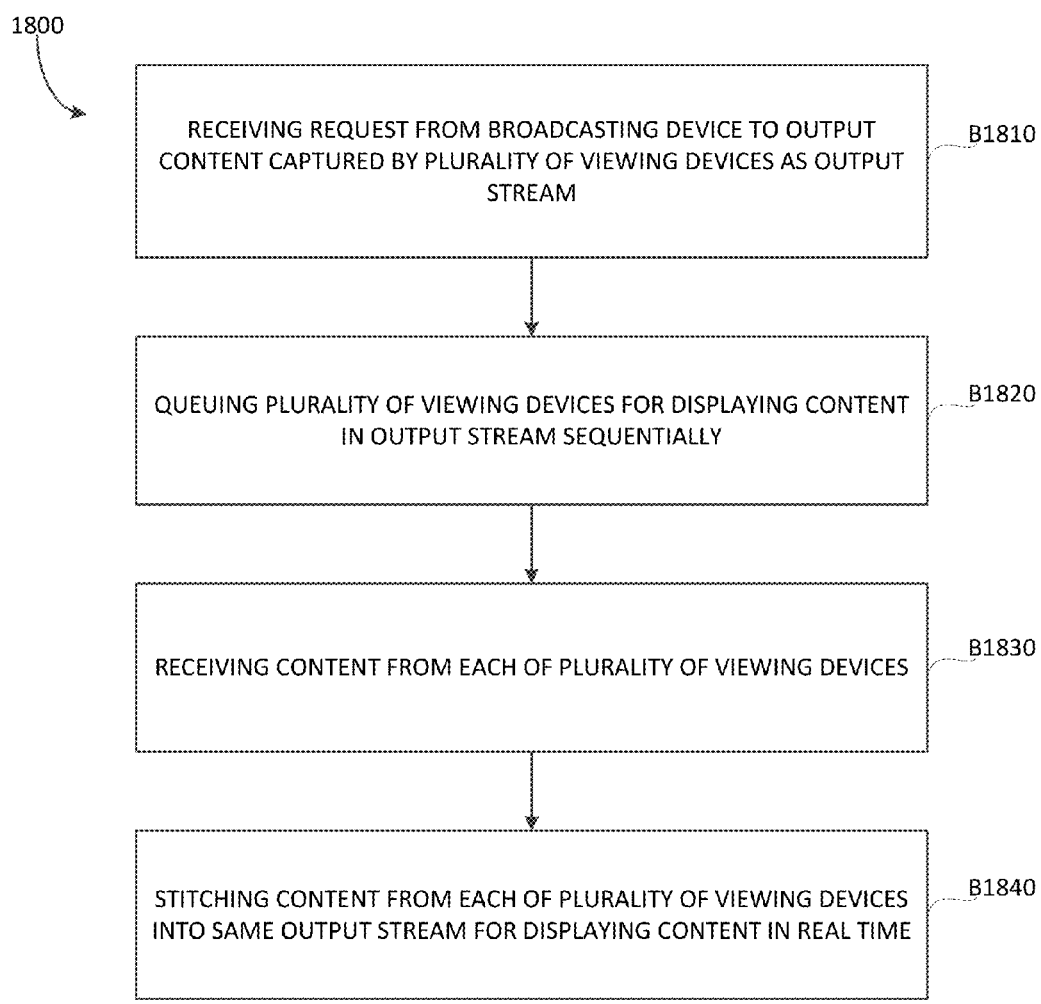
FIG. 18 is a process flowchart illustrating an interactive streaming method according to various embodiments.

FIG. 18 is a process flowchart illustrating an interactive streaming method 1800 according to various embodiments. Referring to FIGS. 1-18, the interactive streaming method 1800 may be performed by the processor 210 of the server 140 according to some embodiments. Initially, the server 140 may be sending the content of the broadcasting device 110 to the viewing devices 120. At block B1810, the server 140 may receive a request from the broadcasting device 110 to output content captured by the viewing devices 120 as the output stream. The broadcaster may select, via the input device 440 of the broadcasting device 110, to trigger features related to sequentially displaying content from the viewing devices 120, as described.

At block B1820, the server 140 may queue the viewing devices 120 for displaying the content in the output stream sequentially. In some embodiments, the viewing devices 120 queued may be devices that are spectating the broadcaster's stream (i.e., receiving media content from the server originating from the broadcasting device 110) shortly prior to or concurrent with the server 140 receiving the request from the broadcasting device 110. For example, when the server 140 receives the request, the server 140 may obtain a list of all viewing devices 120 that are receiving the broadcaster's media content from the server 140.

The viewing devices 120 may be queued in any suitable manner. In some embodiments, the viewing devices 120 may be queued at random. In some embodiments, the viewing devices 120 may be queued based on the time at which each of the viewing devices 120 started to receive the content of the broadcasting device to the viewers. That is, the time at which each of the viewing devices 120 joined the broadcaster's stream. The server 140 may send an indication of the position in the queue to each of the corresponding viewing devices 120 for reference.

At block B1830, the server 140 may receive the content from each of the viewing devices 120. In some embodiments, the content may be received in order of the queue positions of the corresponding viewing devices 120 in the manner described.

At block B1840, the server 140 may stitch the content from each of the viewing devices 120 into a same output stream for displaying content in real time in the manner described. The server 140 may output the stitched content to each of the viewing devices 120.

Figure 19:
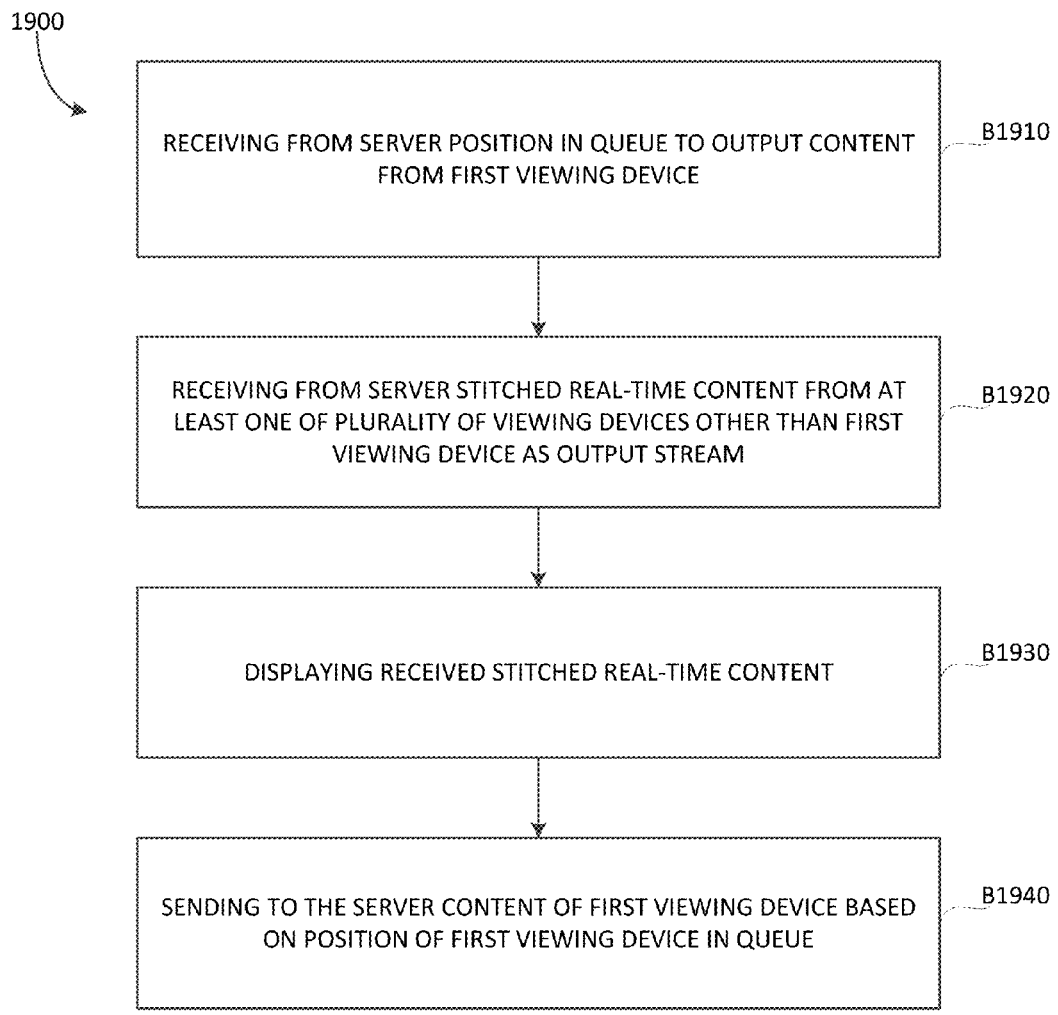
FIG. 19 is a process flowchart illustrating an interactive streaming method according to various embodiments.

FIG. 19 is a process flowchart illustrating an interactive streaming method 1900 according to various embodiments. Referring to FIGS. 1-19, the interactive streaming method 1800 may be performed by the processor 310 of one of the viewing devices 120 (e.g., the first viewing device 120*a*) according to some embodiments. At block B1910, the first viewing device 120*a* may receive, from the server 140, the position in queue to output the content of the first viewing device 120*a*. At block B1920, the first viewing device 120*a* may receive from the server 140 the stitched real-time content (stitched from the at least one of the viewing devices 120 other than the first viewing device 120*a*) as output stream.

At block B1930, the first viewing device 120*a* may display the received stitched real-time content with the output device 330 of the first viewing device 120*a*. At block B1940, the first viewing device 120*a* may send to the server 140 the content of the first viewing device 120*a* based on the position of the first viewing device 120*a* in queue. That is, the first viewing device 120*a* may send its own content when it is about time that its own content is to be outputted according to the queue position. Thereafter, the first viewing device 120*a* may continue to receive the stitched real-time content from other viewing devices 120 (if any) whose content has not been outputted yet.

Figure 20:
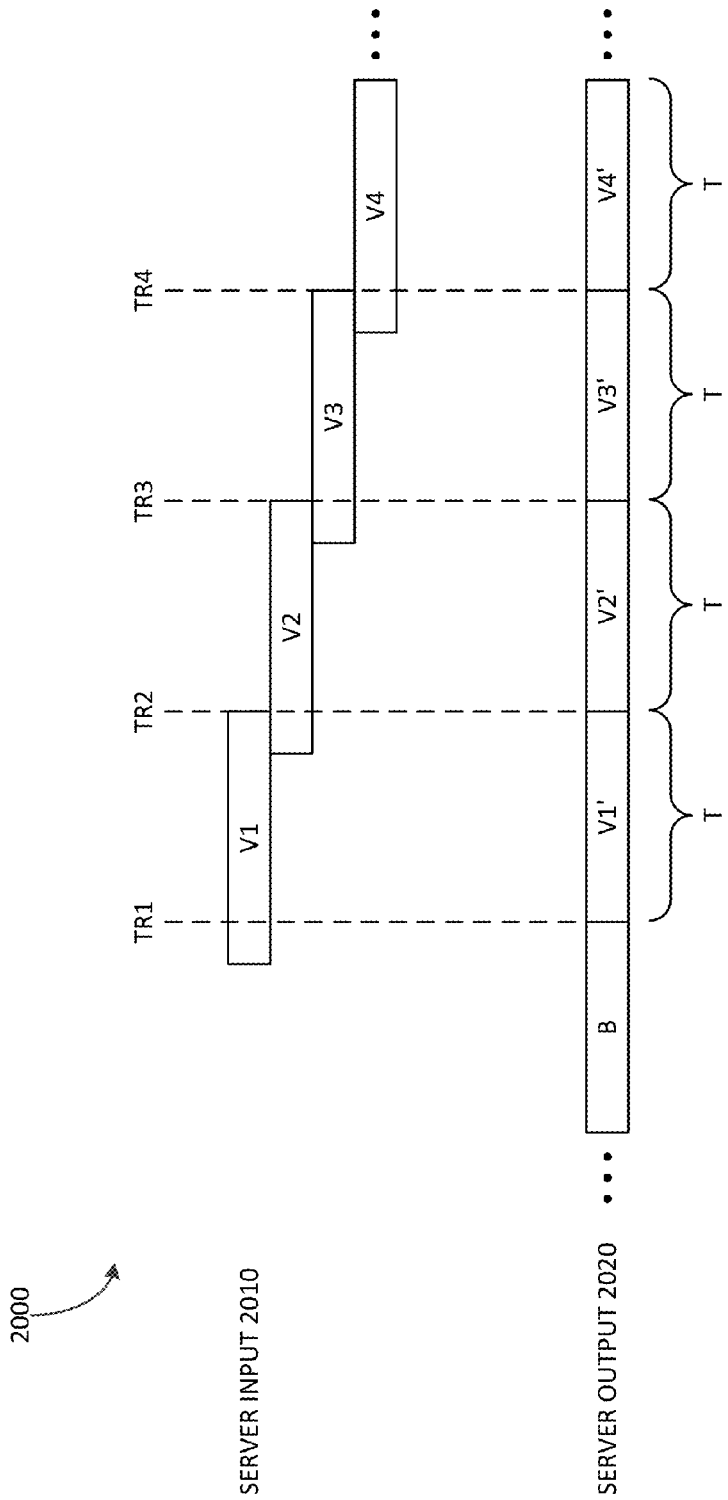
FIG. 20 is a schematic diagram illustrating an example of a stitching method according to various embodiments.

FIG. 20 is a schematic diagram 2000 illustrating an example of a stitching method according to various embodiments. Referring to FIGS. 1-20, the server input 2010 may be media content received from the viewing devices 120, in a manner such as, but not limited to, described with respect to block B1930. For example, media content received from one of the viewing devices 120 having a first position in queue may be shown as V1. Media content received from another of the viewing devices 120 having a second position in queue may be shown as V2. Media content received from another of the viewing devices 120 having a third position in queue may be shown as V3. Media content received from another of the viewing devices 120 having a fourth position in queue may be shown as V4, and so forth.

The server output 2020 may correspond to the stitched content. Initially, the media content from the broadcasting device 110 (e.g., content B) may be distributed to the viewing devices 120 prior to a first transition point TR1. At the first transition point TR1, a first stitched media content V1' corresponding to V1 may be outputted. At a second transition point TR2, the first stitched media content V1' may no longer be outputted, and instead, a second stitched media content V2' corresponding to V2 may be outputted. Similarly, at a third transition point TR3, the second stitched media content V2' may no longer be outputted, and instead, a third stitched media content V3' corresponding to V3 may be outputted. At a fourth transition point TR4, the third stitched media content V3' may no longer be outputted, and instead, a fourth stitched media content V4' corresponding to V4 may be outputted, and so on. Each of the first to fourth stitched media contents V1'-V4' may be of a same predetermined interval T of a predetermined length. The predetermined interval T may be, for example, but not limited to, 2 seconds, 3 seconds, 5 seconds, 10 seconds, or the like. Each of the V1-V4 may be received slightly before the transitions points (TR1-TR4), to ensure seamless stitching and accounting for local network latency. In some embodiments, T may be set as a default value by the server 140. In other embodiments, the server 140 may receive an indication of T to correspond to a broadcaster-set length of time received from the broadcasting device 110.

FIG. 21 is an example of a display screen 2100 displaying an interactive broadcasting interface according to various embodiments. Referring to FIGS. 1-21, the display screen 2100 may be displayed by the output device 330 of one of the viewing devices 120 (e.g., the first viewing device 120a). Additionally, the display screen 2100 may be displayed by the output device 430 of the broadcasting device 110. The display screen 2100 may include a current user icon 2110 indicating a current viewing device that is presenting its media content in real time. For example, the current user icon 2110 may correspond to the output media stream 2140. The display screen 2100 may also include at least subsequent user icons 2120a, 2120b, 2120c that represent subsequent viewing devices 120 queued for outputting media content following the viewing device corresponding to the current user icon 2110. The current user icon 2110 may be graphically distinguished from the subsequent user icons 2120a, 2120b, 2120c. The information relates to the current user icon 2110 and the subsequent user icons 2120a, 2120b, 2120c may be received from the server 140.

The display screen 2100 may also include a first timer 2130 counting down to a time that media content from the first viewing device 120a is to be outputted. Given that the predetermined interval T, the position of the first viewing device 120a, and a position of the current viewing device may be known, the time shown on the first timer 2130 may accordingly be determined. In alternative embodiments, synchronized time may be pushed from the server 140 to the first viewing device 120a. In other embodiments, instead of or in addition to the first timer 2130 being displayed, the display screen 2100 may include the position in queue associated with the first viewing device 120a.

FIG. 22 is an example of a display screen 2200 displaying an interactive broadcasting interface according to various embodiments. Referring to FIGS. 1-23, the display screen 2200 may be displayed by the output device 330 of one of the viewing devices 120 (e.g., the first viewing device 120a). Additionally, the display screen 2200 may be displayed by the output device 430 of the broadcasting device 110. In particular embodiments, the display screen 2200 may be displayed by the first viewing device 120a when first viewing device 120a is allowed to send its media content to the server 140 to be pushed to the viewing devices 120. For example, a current user icon 2210 may correspond to the first viewing device 120a. Subsequent user icons 2220a, 2220b, 2220c may be displayed in the display screen 2200 to indicate identities of the viewing devices 120 that have later positions in the queue. An output media stream 2240 may correspond to data captured by the input device 340 of the first viewing device 120a. A notification window 2230 may be displayed to notify the first viewer that it is the first viewer's turn to output media content. A second timer 2250 may indicate to the first viewer an amount of time left in the predetermined time interval T.

Accordingly, embodiments described herein provide a standards-based live streaming with various enhancements. The embodiments benefit from mobile-first and mobile-centric approaches for data reliability and offline performance. Content streams from the broadcaster and the viewers alike may be stitched together for seamless output.

Various embodiments described above with reference to FIGS. 1-22 include the performance of various processes or tasks. In various embodiments, such processes or tasks may be performed through the execution of computer code read from computer-readable storage media. For example, in various embodiments, one or more computer-readable storage mediums store one or more computer programs that, when executed by a processor cause the processor to perform processes or tasks as described with respect to the processor in the above embodiments. Also, in various embodiments, one or more computer-readable storage mediums store one or more computer programs that, when executed by a device, cause the computer to perform processes or tasks as described with respect to the devices mentioned in the above embodiments. In various embodiments, one or more computer-readable storage mediums store one or more computer programs that, when executed by a database, cause the database to perform processes or tasks as described with respect to the database in the above embodiments.

Thus, embodiments include program products including computer-readable or machine-readable media for carrying or having computer or machine executable instructions or data structures stored thereon. Such computer-readable storage media can be any available media that can be accessed, for example, by a general purpose or special purpose computer or other machine with a processor. By way of example, such computer-readable storage media can include semiconductor memory, flash memory, hard disks, optical disks such as compact disks (CDs) or digital versatile disks (DVDs), magnetic storage, random access memory (RAM), read only memory (ROM), and/or the like. Combinations of those types of memory are also included within the scope of computer-readable storage media. Computer-executable program code may include, for example, instructions and data which cause a computer or processing machine to perform certain functions, calculations, actions, or the like.

The embodiments disclosed herein are to be considered in all respects as illustrative, and not restrictive. The present disclosure is in no way limited to the embodiments described above. Various modifications and changes may be made to the embodiments without departing from the spirit and scope of the disclosure. Various modifications and changes that come within the meaning and range of equivalency of the claims are intended to be within the scope of the disclosure.

What is claimed is:

1. A method for interactive streaming among a broadcasting device and a plurality of viewing devices, comprising:
   receiving, by a server, a request from the broadcasting device to output content captured by the plurality of viewing devices as an output stream;
   queuing, by the server, the plurality of viewing devices by determining a queue according to which content from the plurality of viewing devices is to be stitched for displaying the content in the output stream sequentially;
   receiving, by the server, the content from each of the plurality of viewing devices; and stitching, by the server, the content from each of the plurality of viewing devices into the same output stream according to the queue for displaying the content in real time;
   wherein determining the queue according to which the content from the plurality of viewing devices is to be stitched comprises:

determining a first position in the queue for a first viewing device of the plurality of viewing devices;
determining a second position in the queue for a second viewing device of the plurality of viewing devices, wherein the second position is after the first position in the queue; and
first content from the first viewing device is stitched to be before second content from the second viewing device in the output stream.

2. The method of claim 1, further comprising sending, by the server, the stitched output stream to the plurality of viewing devices and the broadcasting device to be displayed.

3. The method of claim 2, further comprising sending, by the server, content of the broadcasting device to the plurality of viewing devices prior to sending the stitched output stream to the plurality of viewing devices.

4. The method of claim 3, wherein the plurality of viewing devices are outputting the content of the broadcasting device concurrent with the server receiving the request.

5. The method of claim 3, wherein the plurality of viewing devices are queued based on a time at which each of the plurality of viewing devices started to receive the content of the broadcasting device.

6. The method of claim 3, wherein the plurality of viewing devices are queued at random.

7. The method of claim 1, further comprising providing, by the server to each of the plurality of viewing devices, an indication of a position in the queue for each of the plurality of viewing devices.

8. The method of claim 1, wherein the request to output content captured by the plurality of viewing devices is based on user input of a broadcaster using the broadcasting device.

9. The method of claim 1, wherein:
a predetermined length of the content from each of the plurality of viewing devices is stitched in the output stream; and
the predetermined length of the content for each of the plurality of viewing devices is the same in the output stream.

10. The method of claim 9, wherein:
the predetermined length is determined by the server as default; or the predetermined length corresponds to a broadcaster-set length of time received from the broadcasting device.

11. A non-transitory computer-readable medium storing computer-readable instructions, such that, when executed by a processor, performs a method for interactive streaming among a broadcasting device and a plurality of viewing devices, the method comprising:
receiving a request from the broadcasting device to output content captured by the plurality of viewing devices as an output stream;
queuing the plurality of viewing devices by determining a queue according to which content from the plurality of viewing devices is to be stitched for displaying the content in the output stream sequentially;
receiving the content from each of the plurality of viewing devices; and stitching the content from each of the plurality of viewing devices into the same output stream according to the queue for displaying the content in real time;
wherein determining the queue according to which the content from the plurality of viewing devices is to be stitched comprises:
determining a first position in the queue for a first viewing device of the plurality of viewing devices;
determining a second position in the queue for a second viewing device of the plurality of viewing devices, wherein the second position is after the first position in the queue; and
first content from the first viewing device is stitched to be before second content from the second viewing device in the output stream.

12. The non-transitory computer-readable medium of claim 11, the method further comprising sending, by the server, the stitched output stream to the plurality of viewing devices and the broadcasting device to be displayed.

13. The non-transitory computer-readable medium of claim 12, the method further comprising sending, by the server, content of the broadcasting device to the plurality of viewing devices prior to sending the stitched output stream to the plurality of viewing devices.

14. The non-transitory computer-readable medium of claim 13, wherein the plurality of viewing devices are outputting the content of the broadcasting device concurrent with the server receiving the request.

15. The non-transitory computer-readable medium of claim 13, wherein the plurality of viewing devices are queued based on a time at which each of the plurality of viewing devices started to receive the content of the broadcasting device.

16. The non-transitory computer-readable medium of claim 13, wherein the plurality of viewing devices are queued at random.

17. The non-transitory computer-readable medium of claim 11, the method further comprising providing, by the server to each of the plurality of viewing devices, an indication of a position in the queue for each of the plurality of viewing devices.

18. The non-transitory computer-readable medium of claim 11, wherein the request to output content captured by the plurality of viewing devices is based on user input of a broadcaster using the broadcasting device.

19. The non-transitory computer-readable medium of claim 11, wherein a predetermined length of the content from each of the plurality of viewing devices is stitched in the output stream.

20. A method for interactive streaming among a broadcasting device and a plurality of viewing devices, comprising:
receiving, by a first viewing device of the plurality of viewing devices from a server, a position in queue for stitching to output content from the plurality of viewing devices:
receiving, by the first viewing device from the server, stitched real-time content from at least one of the plurality of viewing devices other than the first viewing device as output stream; displaying, by the first viewing device, the received stitched real-time content; and sending, by the first viewing device to the server, the content of the first viewing device based on the position of the first viewing device in queue;
wherein the queue according to which the content from the plurality of viewing devices is to be stitched comprises:
a first position in the queue for a first viewing device of the plurality of viewing devices;
a second position in the queue for a second viewing device of the plurality of viewing devices, wherein the second position is after the first position in the queue; and first content from the first viewing device is stitched to be before second content from the second viewing device in the output stream.

21. The method of claim 1, wherein the content from the plurality of viewing devices is received according to the queue.

* * * * *